(12) United States Patent
Adachi et al.

(10) Patent No.: US 7,435,477 B2
(45) Date of Patent: Oct. 14, 2008

(54) PARTICULATE WATER ABSORBENT CONTAINING WATER ABSORBENT RESIN AS A MAIN COMPONENT

(75) Inventors: Yoshifumi Adachi, Himeji (JP); Takahiro Kitano, Himeji (JP); Hirotama Fujimaru, Kishiwada (JP); Hiroyuki Ikeuchi, Himeji (JP); Katsuyuki Wada, Himeji (JP)

(73) Assignee: Nippon Shokubi Co., Ltd., Osaka (JP)

( * ) Notice: Subject to any disclaimer, the term of this patent is extended or adjusted under 35 U.S.C. 154(b) by 852 days.

(21) Appl. No.: 10/509,000

(22) PCT Filed: Feb. 9, 2004

(86) PCT No.: PCT/JP2004/001358

§ 371 (c)(1),
(2), (4) Date: Sep. 27, 2004

(87) PCT Pub. No.: WO2004/069404

PCT Pub. Date: Aug. 19, 2004

(65) Prior Publication Data

US 2005/0221980 A1  Oct. 6, 2005

(30) Foreign Application Priority Data

Feb. 10, 2003 (JP) ............................ 2003-032770
Mar. 13, 2003 (JP) ............................ 2003-068579

(51) Int. Cl.
*B32B 5/16* (2006.01)

(52) U.S. Cl. .................. 428/407; 428/500; 428/507; 525/326.7; 525/328.5; 525/328.8; 525/328.9; 525/329.4; 525/329.6; 525/329.9; 525/330.1; 525/380; 525/382; 525/384

(58) Field of Classification Search .............. 525/330.1, 525/326.7, 328.5, 328.8, 328.9, 329.4, 329.6, 525/329.9; 428/407, 500, 507
See application file for complete search history.

(56) References Cited

U.S. PATENT DOCUMENTS

| | | |
|---|---|---|
| RE32,649 E | 4/1988 | Brandt et al. |
| 5,061,259 A | 10/1991 | Goldman et al. |
| 5,140,076 A | 8/1992 | Hatsuda et al. |
| 5,147,343 A | 9/1992 | Kellenberger |
| 5,149,335 A | 9/1992 | Kellenberger et al. |
| 5,419,956 A | 5/1995 | Roe |
| 5,453,323 A | 9/1995 | Chambers et al. |
| 5,462,972 A | 10/1995 | Smith et al. |
| 5,562,646 A | 10/1996 | Goldman et al. |
| 5,601,542 A | 2/1997 | Melius et al. |
| 5,669,894 A | 9/1997 | Goldman et al. |
| 5,712,316 A | 1/1998 | Dahmen et al. |
| 5,760,080 A * | 6/1998 | Wada et al. ............... 524/559 |
| 5,797,893 A | 8/1998 | Wada et al. |
| 5,843,059 A | 12/1998 | Niemeyer et al. |
| 5,994,440 A | 11/1999 | Staples et al. |
| 6,087,002 A | 7/2000 | Kimura et al. |
| 6,107,358 A | 8/2000 | Harada et al. |
| 6,127,454 A | 10/2000 | Wada et al. |
| 6,150,582 A | 11/2000 | Wada et al. |
| RE37,021 E | 1/2001 | Aida |
| 6,184,433 B1 | 2/2001 | Harada et al. |
| 6,194,531 B1 | 2/2001 | Hatsuda et al. |
| 6,297,335 B1 | 10/2001 | Funk et al. |
| 6,414,214 B1 | 7/2002 | Engelhardt et al. |
| 6,444,744 B1 | 9/2002 | Fujimaru et al. |
| 6,562,879 B1 | 5/2003 | Hatsuda et al. |
| 6,586,549 B1 | 7/2003 | Hatsuda et al. |
| 2001/0049514 A1 | 12/2001 | Dodge et al. |
| 2002/0165288 A1 | 11/2002 | Frenz et al. |

FOREIGN PATENT DOCUMENTS

| | | |
|---|---|---|
| EP | 0532002 A1 | 3/1993 |
| EP | 0605215 A1 | 6/1994 |
| EP | 0629411 A1 | 12/1994 |
| EP | 0712659 A1 | 5/1996 |
| EP | 0707603 B1 | 9/1997 |
| EP | 0937739 A2 | 8/1999 |
| EP | 0940148 A1 | 9/1999 |
| EP | 1029886 A2 | 8/2000 |
| EP | 1153656 A2 | 11/2001 |
| GB | 2267094 A | 11/1993 |
| JP | 63-275608 A | 11/1988 |
| JP | 11-43508 A | 2/1999 |
| JP | 11-58615 A | 3/1999 |
| JP | 2000-302876 A | 10/2000 |

(Continued)

OTHER PUBLICATIONS

Office Action mailed Jun. 23, 2006 by the Chinese Patent Office for corresponding Chinese Application No. 200480000104.7.

*Primary Examiner*—Bernard Lipman
(74) *Attorney, Agent, or Firm*—Nixon & Vanderhye P.C.

(57) ABSTRACT

A particulate water absorbent contains a water absorbent resin as a main component, the water absorbent resin being a crosslinked polymer of a water-soluble unsaturated monomer. The water absorbent resin is particular in shape and contains particles of a particle size in a range of not less than 106 μm and less than 850 μm in an amount of not less than 90 mass percent with respect to the total mass of the water absorbent resin contained in the particulate water absorbent. The particulate water absorbent has a first salt concentration absorption index of not less than 0.60 as measured by a formula below when ion exchange water is used as an aqueous solution of a constant salt concentration: (salt concentration absorption index)=(absorbency against a pressure of 4.83 kPa with respect to the aqueous solution of a constant salt concentration)/(absorbency against no pressure with respect to the aqueous solution of a constant salt concentration).

18 Claims, 1 Drawing Sheet

FOREIGN PATENT DOCUMENTS

| | | |
|---|---|---|
| JP | 2001-98170 A | 4/2001 |
| JP | 2002-212301 A | 7/2002 |
| JP | 2003-105092 A | 4/2003 |
| WO | WO 95/22356 A1 | 8/1995 |
| WO | WO 02/053198 A1 | 7/2002 |
| WO | WO 02/100451 A1 | 12/2002 |

* cited by examiner

PARTICULATE WATER ABSORBENT CONTAINING WATER ABSORBENT RESIN AS A MAIN COMPONENT

This application is the U.S. national phase of international application PCT/JP2004/001358 filed 9 Feb. 2004, which designated the US and claims priority to JP Application No. 2003-032770 filed 10 Feb. 2003 and JP Application No. 2003-068579 filed 13 Mar. 2003. The entire contents of these applications are incorporated herein by reference.

TECHNICAL FIELD

The present invention relates to a particulate water absorbent containing a water absorbent resin as a main component, and more specifically relates to a particulate water absorbent delivering an excellent absorptive capacity for a liquid such as urine.

BACKGROUND ART

Recently, water absorbent resins have been used extensively as a component of sanitary articles, such as paper diapers, sanitary napkins, and incontinence pads, to absorb body fluids. Examples of such water absorbent resins include: a partially neutralized crosslinked polymer of polyacrylic acid; a hydrolyzed graft polymer of starch and acrylic acid; a saponified copolymer of vinyl acetate and acrylic ester; a hydrolyzed copolymer of acrylonitrile or acrylamide, or a crosslinked product thereof; and a crosslinked polymer of cationic monomers.

Such a water absorbent resin has been required to have excellent properties, including an ability to absorb a sufficient amount of liquid at a sufficient speed when in contact with an aqueous fluid like a body fluid. Other required properties include gel strength, gel permeability, and absorbing power for absorbing liquid from a base material containing an aqueous fluid. Further, in recent years, there has been an ongoing demand for a water absorbent resin powder having a very narrow particle size distribution, or that with high absorbency and low water-soluble content. It is also necessary that such water absorbent resin powder has high absorbency against pressure, and liquid permeability against pressure.

For example, Documents 1 through 24 below disclose parameters and measurement methods for specifying properties of such a water absorbent resin.

Specifically, Document 1 (U.S. Reissue Pat. No. 32,649) proposes a water absorbent resin that excels in gel strength, soluble content, and absorbency. Document 2 (U.K. Patent No. 2,267,094B) proposes a water absorbent resin with excellent liquid permeability against no pressure, and excellent absorption speed and absorbency. Further, Document 3 (U.S. Pat. No. 5,061,259), Document 4 (U.S. Pat. No. 5,419,956), Document 5 (U.S. Pat. No. 6,087,002), and Document 6 (European Patent No. 629,411) propose techniques for specifying a particle size distribution.

Further, many types of water absorbent resins with excellent absorbency against varying pressures and their measurement methods have been proposed. For example, there has been proposed water absorbent resins whose properties include absorbency against pressure either by itself or in combination with other properties, as disclosed in Document 7 (European Patent No. 707,603), Document 8 (European Patent No. 712,659), Document 9 (European Patent No. 1,029,886), Document 10 (U.S. Pat. No. 5,462,972), Document 11 (U.S. Pat. No. 5,453,323), Document 12 (U.S. Pat. No. 5,797,893), Document 13 (U.S. Pat. No. 6,127,454), Document 14 (U.S. Pat. No. 6,184,433), Document 15 (U.S. Pat. No. 6,297,335), and Document 16 (U.S. Reissue Pat. No. Re37,021).

Further, water absorbent resins with excellent impact resistance in terms of property degradation have been documented, as disclosed in Document 17 (U.S. Pat. No. 5,140, 076) and Document 18 (U.S. Pat. No. 6,414,214B1). Further, a water absorbent resin that specifies an amount of dust is proposed in, for example, Document 19 (U.S. Pat. No. 5,994, 440), and a water absorbent resin with little coloring is proposed, for example, in Document 20 (U.S. Pat. No. 6,444, 744). As to resistance to urine, Document 21 (U.S. Pat. No. 6,194,531) and Document 22 (European Patent No. 940,148) propose water absorbent resins with excellent gel durability and absorptive power with respect to a liquid such as an aqueous solution of L-ascorbic acid, and Document 23 (European Patent No. 1,153,656) discloses a water absorbent resin with excellent breathability. Further, a water absorbent resin with less residual monomer is proposed in Document 24 (European Patent No. 605,215).

It is also known that water absorbent resins with specific properties are suitable for absorbent articles (diapers) having particular properties, configuration, and/or polymer concentration, as disclosed in Document 25 (U.S. Pat. No. 5,147, 343), Document 26 (U.S. Pat. No. 5,149,335), Document 27 (European Patent No. 532,002), Document 28 (U.S. Pat. No. 5,601,542), Document 29 (U.S. Pat. No. 5,562,646), Document 30 (U.S. Pat. No. 5,669,894), Document 31 (U.S. Pat. No. 6,150,582), Document 32 (International Publication WO02/53198), Document 33 (U.S. Pat. No. 5,843,059), and Document 34 (U.S. Patent Application No. 2001/49514).

The water absorbent resins have thus been developed in view of these different properties, and some of them have been manufactured and used by targeting and specifying these properties. However, a problem remains that, even with the control of specific properties (performance), the water absorbent resins still cannot deliver sufficient performance in practical use as in paper diaper applications. Particularly, the performance of the water absorbent resins is not sufficient when they are used in sanitary products that contain an increased amount of water absorbent resin and a decreased amount of fiber material (high concentration of water absorbent resin).

DISCLOSURE OF INVENTION

The present invention was made in view of conventional water absorbent resins that have been developed by taking into account various properties (speed of absorption, absorbency against no pressure (no load), absorbency against pressure (load), gel strength, durability, soluble content, particle size, etc.), and it is an object of the present invention to solve the conventional problem that controlling and designing of these properties are not sufficient to manufacture water absorbent resins that can perform satisfactorily in actual applications, and thereby provide a water absorbent resin that is suitable for actual applications.

After extensive study to achieve this object, the inventors of the present invention accomplished the invention by finding that a change in absorbency with salt concentration, i.e., a change in absorbency under a specific pressure has a large influence in actual applications as in diapers, and that a water absorbent superior to conventional models could be realized when the water absorbent has a constant absorbency (under pressure) and a constant permeability. None of these properties has been conventionally recognized.

That is, the present invention provides a particulate water absorbent containing a water absorbent resin as a main component, the water absorbent resin being prepared by crosslinking a water-soluble unsaturated monomer. The water absorbent resin is particular in shape and contains particles of a particle size in a range of not less than 106 μm and less than 850 μm in an amount of 90 to 100 mass percent with respect to a total mass of the water absorbent resin. The particulate water absorbent has a first salt concentration absorption index of not less than 0.60 as measured by a formula (1) below when ion exchange water is used as an aqueous solution of a constant salt concentration:

(salt concentration absorption index)=(absorbency for an aqueous solution of a constant salt concentration against a pressure of 4.83 kPa)/(absorbency for an aqueous solution of a constant salt concentration against no pressure) (1), where the numerator is the absorbency against a pressure of 4.83 kPa when the particulate water absorbent is impregnated with the aqueous solution of a constant salt concentration for 60 minutes, and the denominator is the absorbency against no pressure when the particulate water absorbent is impregnated with the aqueous solution of a constant salt concentration for 60 minutes.

Further, the present invention provides a particulate water absorbent containing a water absorbent resin as a main component, the water absorbent resin being prepared by crosslinking a water-soluble unsaturated monomer. The water absorbent resin is particular in shape and contains particles of a particle size of not less than 106 μm to less than 850 μm in an amount of not less than 90 mass percent with respect to a total mass of the water absorbent resin. The particulate water absorbent has an absorbency of not less than 50 g/g when impregnated with ion exchange water for 60 minutes against a pressure of 4.83 kPa.

For a fuller understanding of the nature and advantages of the invention, reference should be made to the ensuing detailed description taken in conjunction with the accompanying drawing.

BEST MODE FOR CARRYING OUT THE INVENTION

Figure 1:
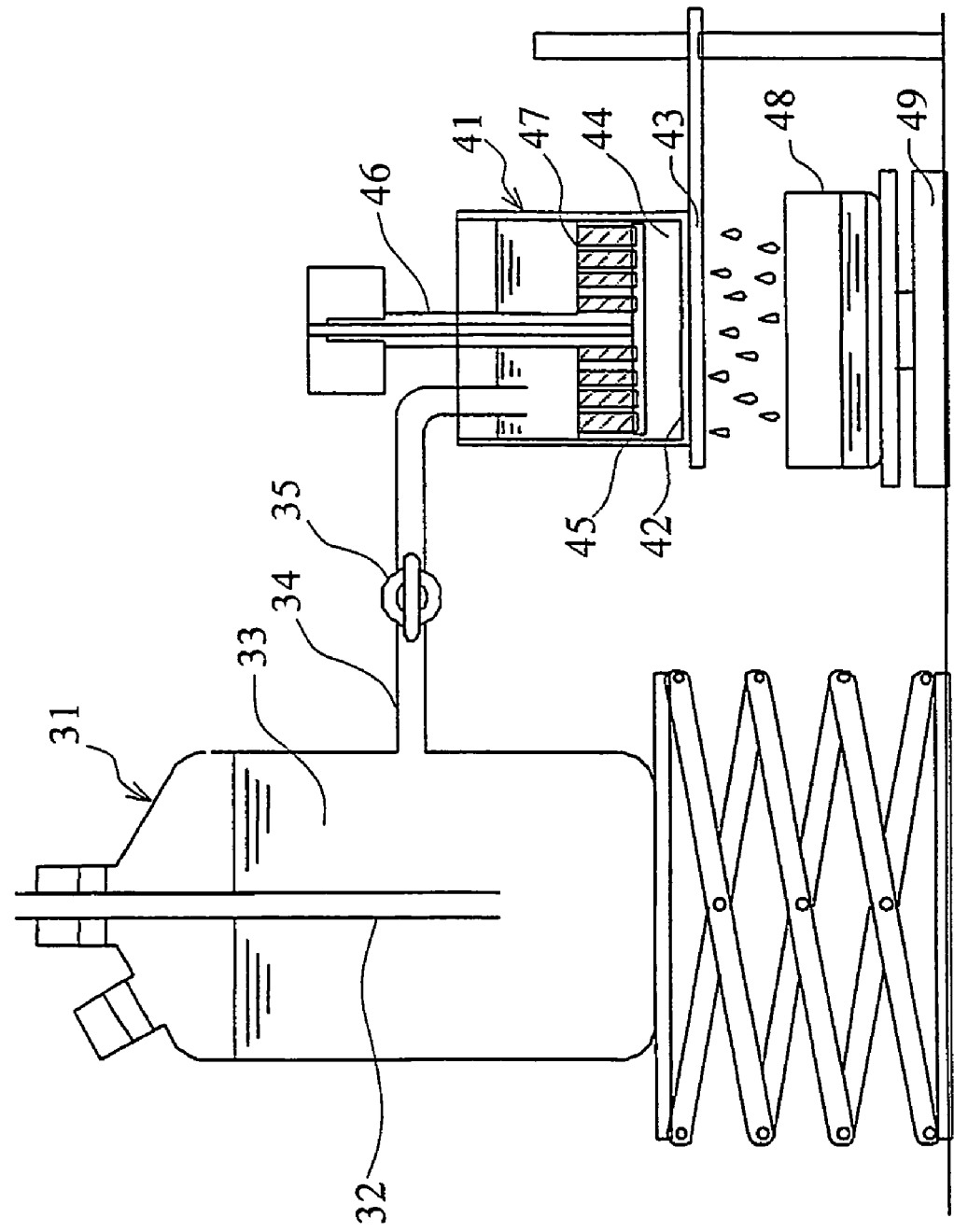
FIG. 1 is a cross sectional view schematically illustrating a measuring device for measuring a gel permeability index.

Detailed description is made below as to particulate water absorbents (water absorbents) according to the present invention. While the invention is susceptible to various modifications and alternative forms, specific embodiments thereof will be described below by way of example. It should be understood, however, that it is not intended to limit the invention to the particular forms disclosed, but on the contrary, the invention is to cover all modifications, equivalents, and alternatives falling within the scope of the invention as defined in the appended claims.

There have been proposed a saline solution (aqueous solution of 0.9 mass (weight) percent sodium chloride) and various types of synthetic urine as the urine model used to evaluate various properties of a water absorbent resin. However, all of these proposals neglect the fact that the composition of human urine varies widely, as substantiated by the disclosure of the foregoing publications. In fact, the urine composition is not uniform, and it varies greatly depending on the environment, diet, age, season, and a variety of other factors. Even within the same individual, the urine composition is fluctuating every minute, depending on the time of day or his/her physical condition.

The present invention was made in view of the conventional problem that the properties of a water absorbent resin have been evaluated using a model solution such as the saline solution or synthetic urine, that is that the conventional water absorbent resin in actual applications cannot respond sufficiently to changes in urine composition. In light of this problem, the inventors of the present invention have recognized the differences in salt concentration of the urine.

Specifically, it was found that the adult urine had an ionic strength substantially equal to that of an aqueous solution of 0.8 to 1.0 mass percent sodium chloride, and that the ionic strength of the infant urine was substantially equal to that of an aqueous solution of 0.3 to 0.7 mass percent sodium chloride. For a newborn baby, the ionic strength of the urine was substantially equal to that of an aqueous solution of 0.2 to 0.4 mass percent sodium chloride. It was also found that the conventional evaluation for evaluating properties of a water absorbent resin using a saline solution (aqueous solution of 0.9 mass percent sodium chloride) was not always suitable and is in fact problematic for actual applications because it did not take into account the actual salt concentration of urine.

Further, the reason the conventional water absorbent resin did not have enough properties for actual applications was found to be a gradual change (lowering) in salt concentration of urine as the urine undergoes ion exchange when it diffuses through a diaper from a point of excretion. In fact, the salt concentration of urine changes at different rates in different parts of the diaper as the urine diffuses through the diaper.

Accordingly, the inventors of the present invention have found that a superior particulate water absorbent that provides constant absorbency irrespective of salt concentration can be provided when the particulate water absorbent contains a water absorbent resin as a main component prepared by crosslinking a water-soluble unsaturated monomer, and when the water absorbent resin is particular in shape and contains particles of a particle size of not less than 106 μm to less than 850 μm in an amount of not less than 90 mass percent and not more than 100 mass percent with respect to the total weight of the water absorbent resin, and when the particulate water absorbent has a first salt concentration absorption index of not less than 0.60 as measured by a formula (1) (defined later) when ion exchange water is used as an aqueous solution of a constant salt concentration.

A particulate water absorbent of the present invention provides a superior gel permeability index irrespective of changes in salt concentration or applied pressure. Therefore, the liquid is able to sufficiently permeate an absorbent material when the water absorbent is used for an absorbent material, thereby increasing the amount of absorbed substance. In effect, leakage can be prevented more effectively with the particulate water absorbent of the present invention.

The following will describe a particulate water absorbent of the present invention in more detail.

(Water absorbent Resin as Crosslinked Polymer of Water-Soluble Unsaturated Monomer)

A water absorbent of the present invention contains a water absorbent resin as a main component, and may optionally contain small amounts of other components, including additives and water. The water absorbent has specific properties, containing the water absorbent resin with a pure resin content of generally 50 to 100 mass percent, preferably 70 to 100 mass percent, more preferably 85 to 100 mass percent, and most preferably 95 to 100 mass percent. The water absorbent is particular in shape, as described below. Further, the water absorbent has specific physical parameters that satisfy specific values.

The water absorbent resin of the present invention is a crosslinked polymer which is water-swelling and substantially water-insoluble, and signifies a publicly-known water-swelling crosslinked polymer forming a substantially water-insoluble hydrogel, which may be anionic, nonionic, or cationic. The water absorbent resin may be crosslinked inside, or may additionally be surface-crosslinked or surface-treated. In the present invention, these different forms of water absorbent resin will be collectively referred to as "water absorbent resin." However, in some cases, the water absorbent resin without the surface-crosslinkage may be distinguished from the one that is additionally surface-crosslinked, as required.

In the present invention, what is indicated by "water-swelling" is to absorb at least 5 g/g water, preferably no less than 50 to 1000 g/g water, when immersed in ion-exchange water. Also, "substantially water-insoluble" in the present invention means that a water-soluble content (water-soluble polymer content) of the water absorbent resin is 0 to 50 mass percent, preferably 0 to 20 mass percent, more preferably 0.01 to 15 mass percent, and even more preferably 0.1 to 10 mass percent. Among these different ranges, a range of 0.1 to 5 mass percent is particularly preferable, and 0.1 to 3 mass percent is most preferable. (Note that, a method of measuring absorbency and an amount of water-soluble content will be described later in Examples.)

The water absorbent resin is a polymer of one kind, or a mixture of two or more kinds of polymers. Specifically, the water absorbent resin is preferably a polymer containing an acid radial, or a polymer containing a carboxylic acid or a carboxyl group (salt of carboxylic acid), or a mixture of these polymers. More specifically, the main component of the water absorbent resin is preferably a crosslinked polymer obtained by polymerizing a water-soluble crosslinked monomer containing an acrylic acid and/or its salt (neutralizer) as a main component, i.e., a polyacrylate crosslinked polymer which contains, if necessary, a graft component.

The acrylic acid and acrylate, which are constitutional units of the water absorbent resin, are preferably contained in a range of 0 to 50 mole percent for the acrylic acid and 100 to 50 mole percent for the acrylate (the total amount of these substances is not more than 100 mole percent), and more preferably in a range of 10 to 40 mole percent for the acrylic acid and 90 to 60 mole percent for the acrylate (the total amount of these substances is not more than 100 mole percent). The molar ratio of acrylate with respect to the total amount of acrylic acid and acrylate is termed "neutralization ratio."

The acrylate as a constitutional unit of the water absorbent resin is formed by neutralizing the acrylic acid in the water absorbent resin. The neutralization may be performed in the form of a monomer before polymerization, or in the form of a polymer during polymerization or after polymerization. Alternatively, the neutralization may be carried out in a combination of these neutralization methods. Examples of salts contained as a constitutional unit of the water absorbent resin include: alkali metal salts such as sodium (poly)acrylate, potassium (poly)acrylate, and lithium (poly)acrylate; and ammonium (poly)acrylate; and amine (poly)acrylate.

In order to facilitate polymerization and restrain coloration, the acrylic acid as a water-soluble unsaturated monomer in the present invention preferably contains p-methoxyphenol (also known as hydroquinone monomethyl ether). The p-methoxyphenol content of the acrylic acid is preferably not more than 200 ppm by mass, more preferably 10 to 160 ppm by mass, further preferably 20 to 140 ppm by mass, and even more preferably 30 to 120 ppm by mass, all with respect to the acrylic acid. Among these different ranges, a range of 40 to 100 ppm by mass is particularly preferable, and 50 to 90 ppm by mass is most preferable. An amount of protoanemonin and/or furfural in the acrylic acid is preferably 0 to 20 ppm by mass, and more preferably 0 to 10 ppm by mass, with respect to the acrylic acid. Among these different ranges, a range of 0 to 3 ppm by mass is particularly preferable, and 0 to 1 ppm by mass is most preferable.

The water-soluble unsaturated monomer of the present invention for obtaining the water absorbent resin may be an acrylic acid (or its salt) substantially all by itself, or may be other kinds of water-soluble unsaturated monomers. Alternatively, these different kinds of water-soluble unsaturated monomers, including the acrylic acid (or its salt), may be used in combination. Non-restrictive examples of the unsaturated monomers other than the acrylic acid (and its salt) include: an anionic unsaturated monomer such as methacrylic acid, maleic acid, vinylsulfonate, styrenesulfonate, 2-(meth)acrylamide-2-methylpropanesulfonate, 2-(meth)acryloylethanesulfonate, and 2-(meth)acryloylpropanesulfonate, and the salts thereof: a nonionic unsaturated monomer including a hydrophilic group, such as acrylamide, methacrylamide, N-ethyl(meth)acrylamide, N-N-propyl(meth)acrylamide, N-isopropyl(meth)acrylamide, N,N-dimethyl(meth)acrylamide, 2-hydroxyethyl(meth)acrylate, 2-hydroxypropyl(meth)acrylate, methoxypolyethyleneglycol(meth)acrylate, polyethyleneglycolmono(meth)acrylate, vinyl pyridine, N-vinylpyrrolidone, N-acryloylpiperidine, N-acryloylpyrrolidine, and N-vinylacetamide; and a cationic unsaturated monomer such as N,N-diethylaminoethyl(meth)acrylate, N,N-diethylaminoethyl(meth)acrylate, N,N-dimethylaminopropyl(meth)acrylate, and N,N-dimetylaminopropyl(meth)acrylamide, and quaternary salts thereof. These unsaturated monomers may be used either individually or in a suitable combination of two or more kinds.

For desirable properties of the water absorbent resin, the present invention uses acrylic acid and its salt as a main component. If necessary, the other water-soluble unsaturated monomers as exemplified above may be used together in an amount of generally 0 to 30 mole percent, preferably 0 to 20 mole percent, and more preferably 0 to 10 mole percent.

For the polymerization of the monomer to obtain the water absorbent resin of the present invention, bulk polymerization or precipitation polymerization may be performed. However, in consideration of the performance of a resultant polymer, controllability of polymerization, and absorption characteristics of a swelling gel, more preferable methods of polymerization are aqueous polymerization and reversed suspension polymerization, using an aqueous solution of the monomer. When an aqueous solution of the monomer is used, the concentration of the monomer in the aqueous solution (hereinafter, "monomer aqueous solution") is determined in accordance with a temperature of the solution and a type of the monomer and hence is not limited to any particular value. However, the concentration is preferably within 10 to 70 mass percent, and more preferably 20 to 60 mass percent. When performing polymerization using an aqueous solution, a solvent other than water may be used as required. The type of solvent used is not particularly limited.

In one method of aqueous polymerization, a monomer aqueous solution is polymerized in a two-arm kneader while pulverizing a hydrogel crosslinked polymer as it is formed. In another method of polymerization, a monomer aqueous solution is supplied to a predetermined container or a belt being driven, and a gel obtained as a result of polymerization is pulverized using, for example, a meat chopper.

To initiate polymerization, a radical polymerization initiator such as potassium persulfate, ammonium persulfate, sodium persulfate, t-butylhydroperoxide, hydrogen peroxide, and 2,2'-azobis (2-amidino-propane) dihydrochloride, or a photopolymerization initiator such as 2-hydroxy-2-methyl-1-phenyl-propane-1-one may be used. These polymerization initiators may be used with a reductant that facilitates decomposition of the polymerization initiator. That is, a redox initiator may be used that combines the polymerization initiator and the reductant. Non-restrictive examples of the reductant include: sulfurous acid (bisulfate) such as sodium sulfite and sodium hydrogen sulfite; L-ascorbic acid (L-ascorbate); reducing metal (reducing metal salt) such as ferrous salt; and amine group. Taking into consideration residual monomer, absorption characteristics, and other properties, the amount of polymerization initiator used is generally within a range of 0.001 to 2 mole percent with respect to the monomer, and preferably within a range of 0.01 to 1 mole percent with respect to the monomer.

The polymerization may be initiated by applying activation energy such as a radiation ray, electron ray, or ultraviolet ray to the reaction system. On this occasion, the above-mentioned polymerization initiators may optionally be used together. A reaction temperature of the polymerization reaction is preferably within a range of 15 to 130° C., and more preferably 20 to 120° C., but not particularly limited to these ranges. A reaction time and a polymerization pressure are not particularly limited either, and they are suitably set in accordance with the type of monomer, the type of polymerization initiator to be used, and a reaction temperature, etc.

The water absorbent resin of the present invention has a crosslinked structure inside the molecule (so-called inner crosslinkage). The inner crosslinkage may be produced by any method, provided that the product water absorbent resin is water insoluble. Specifically, the inner crosslinkage may be made without using a crosslinking agent (self crosslinkage). However, it is more preferable that the inner crosslinkage be made by the copolymerization or reaction of a crosslinking agent (inner crosslinking agent) that has not less than two polymerizable unsaturated groups or not less than two reactive groups within a molecule.

Examples of such an inner crosslinking agent includes N,N'-methylenebis(meth)acrylamide, (poly)ethyleneglycol di(meth)acrylate, (poly)propyleneglycol di(meth)acrylate, trimethylolpropanetri(meth)acrylate, glyceroltri(meth)acrylate, glycerolacrylatemethacrylate, ethyleneoxide denatured trimethylolpropanetri(meth)acrylate, pentaerythritolhexa(meth)acrylate, triallyl cyanurate, triallyl isocyanurate, triallyl phosphate, triallyl amine, poly(meth)allyloxyalkane, (poly) ethyleneglycoldiglycidylether, glyceroldiglycidylether, ethylene glycol, polyethylene glycol, propylene glycol, glycerine, pentaerythritol, ethylenediamine, ethylene carbonate, propylene carbonate, polyethyleneimine, and glycidyl(meth) acrylate.

These inner crosslinking agents may be used either individually or in a suitable combination of two or more kinds. The inner crosslinking agent may be added to the reaction system either at once or in separate doses. When using one or more inner crosslinking agents, it is preferable that a compound including not less than two polymerizable unsaturated groups is always used for the polymerization, taking into account the absorption characteristics or other properties of the product water absorbent.

For desirable properties of the water absorbent resin and water absorbent, the amount of inner crosslinking agent used is preferably 0.001 to 2 mole percent, more preferably 0.005 to 1 mole percent, further preferably 0.005 to 0.7 mole percent, and even more preferably 0.01 to 0.5 mole percent, all with respect to the water-soluble unsaturated monomer (excluding the inner crosslinking agent). Within these ranges, an amount of 0.01 to 0.2 mole percent is particularly preferable, and 0.03 to 0.15 mole percent is most preferable.

When the inner crosslinking agent is used to form a crosslinked structure inside the water absorbent resin, the inner crosslinking agent is added to the reaction system before, during, or after the polymerization of the water-soluble unsaturated monomer, or after the neutralization of the water-soluble unsaturated monomer.

Note that, in the polymerization, the following substances may be added to the reaction system: 0 to 50 mass percent of hydrophilic polymer (with respect to the mass of water-soluble unsaturated monomer), such as starch and cellulose, a derivative of starch and cellulose, polyvinyl alcohol, polyacrylic acid (polyacrylate), and crosslinked polyacrylic acid (crosslinked polyacrylate); 0 to 10 mass percent of foaming agent (with respect to the mass of water-soluble unsaturated monomer), such as (hydrogen) carbonate, carbon dioxide, azo compound, and inactive organic solvent; a surfactant; a chelating agent; and a chain transfer agent such as hypophosphorous acid (hypophosphate).

The hydrogel crosslinked polymer obtained through the polymerization process is dried at the time of polymerization or after the polymerization. Drying is carried out generally at a temperature of 60 to 250° C., more preferably 100 to 220° C., and most preferably 120 to 200° C. The drying time varies depending on the surface area and water content of the polymer and the type of drier used. In general, the drying time is selected to be 1 minute to 3 hours, and more preferably 10 minutes to 2 hours, depending on a desired water content. The water content of the water absorbent resin of the present invention is not particularly limited. (As the term is used herein, the "water content" of the is defined by the amount of water contained in the water absorbent resin as measured by the proportion of the lost weight after drying in the mass of the water absorbent resin before drying when 1 g of the water absorbent resin is dried for 3 hours at 180° C.). However, taking into consideration the properties of the product water absorbent resin, the water absorbent resin is a powder which is remains fluidic at room temperatures, with a water content of preferably 0.2 to 30 mass percent, more preferably 0.3 to 15 mass percent, and most preferably 0.5 to 10 mass percent. (Note that, the terms "water absorbent resin" is used in the present invention even when it contains only a small amount of water of not more than 30 percent by mass.)

A manufacturing process of the present invention includes a pulverizing step in which the hydrogel crosslinked polymer obtained in a polymerization step is pulverized into a particulate water absorbent resin using a pulverizer after a drying step. The particles of the water absorbent resin so obtained are not limited to a particular shape, and may be spherical, crushed, or irregularly crushed in shape. However, it is preferable that the hydrogel crosslinked polymer is pulverized in the pulverizing step into an irregularly crushed shape.

In the present invention, a proportion of fine particles in the water absorbent or water absorbent resin should preferably be as small as possible (particle-size of preferably less than 106 µm, and more preferably less than 150 µm). In concrete terms, a proportion of fine particles is less than 10 mass percent, preferably less than 5 mass percent, more preferably less than 3 mass percent, further preferably less than 2 mass percent, and most preferably less than 1 mass percent. Further, in the present invention, a proportion of coarse particles in the water absorbent resin should preferably be as small as possible (particle size of preferably not less than 850 µm, and more preferably not less than 500 µm). That is, the water absorbent resin of the present invention contains particles of 850 to 106 µm in diameter (preferably 850 to 150 µm in diameter) that are contained in an amount of 90 to 100 mass percent, preferably 97 to 100 mass percent, more preferably 98 to 100 mass percent, and most preferably 99 to 100 mass percent.

The particulate water absorbent resin is then turned into a particulate water absorbent of the present invention by surface modification. The surface modification of the present invention either crosslinks the surface or surface portion (0.001 µm to several tens of microns deep) of the particle or coats the surface of the particle with an inactive additive such as inorganic powder.

Taking into account the properties of the water absorbent resin, the amount of surface modifier used (e.g., a surface crosslinking agent, or an inactive additive such as water-insoluble fine particles) with respect to 100 parts by mass of the water absorbent resin is within a range of 0.001 to 10 parts by mass, preferably 0.01 to 8 parts by mass, more preferably 0.05 to 5 parts by mass, and most preferably 0.1 to 2 parts by mass.

The surface crosslinkage is carried out to improve properties of the water absorbent resin by increasing the density of crosslinkage higher in the vicinity of the surface of the water absorbent resin than inside the particles. The surface crosslinkage is carried out in such a manner that only the surface of the water absorbent resin is crosslinked by adding one or more kinds of surface crosslinking agents (termed "secondary crosslinking agent" as opposed to the inner crosslinking agent) to the water absorbent resin.

As the surface crosslinking agent, a dehydrating crosslinking agent is used. Specific examples of the surface crosslinking agent when the water absorbent resin contains a carboxyl group include: a crosslinking agent including hydroxyl groups such as polyalcohol; a crosslinking agent including amino groups such as polyamine; and a cyclic crosslinking agent which generates a hydroxyl group or amino group when the ring is opened, whereby the hydroxyl group or amino group undergoes a crosslinking reaction. The cyclic crosslinking agent may be alkylene carbonate, monooxazolidinone compound, dioxazolidinone compound, polyoxazolidinone compound, or oxetane compound such as 3-methyl-3-oxatanemethanol, for example.

More specific examples of the dehydrating crosslinking agent are: a polyalcohol compound such as propylene glycol, 1,3-propanediol, 2-methyl-1,3-propanediol, glycerin, 1,4-butanediol, and 1,5-pentanediol; an alkylene carbonate compound such as 1,3-dioxolane-2-one, and 4-methyl-1,3-dioxolane-2-one; and a (poly)oxetane compound such as 3-methyl-3-oxetanemethanol. To maximize the effects of the present invention, it is preferable to use a dehydrating crosslinking agent of at least one kind selected from the group consisting of polyalcohol, alkylene carbonate, an oxazolidinone compound, and a (poly)oxetane compound. It is more preferable that polyalcohol is always used.

Apart from the dehydrating crosslinking agents as exemplified above, other examples of the surface crosslinking agent include: epoxy compounds such as ethyleneglycoldiglycidylether and γ-glycidoxypropyltrimethoxysilane; polyoxazoline compounds such as 1,2-ethylenebisoxazoline; silane coupling agents such as γ-aminopropyltrimethoxysilane; poly-aziridine compounds such as 2,2-bishydroxymethylbutanol-tris[3-(1-aziridinyl)propionate]; and non-dehydrating crosslinking agents of polyvalent metals such as beryllium, magnesium, calcium, strontium, zinc, aluminum, iron, chromium, manganese, titan, and zirconium.

The surface crosslinking agent may be mixed with the water absorbent resin using water and/or a hydrophilic organic solvent.

The amount of water used as a solvent is preferably 0.1 to 10 parts by mass; more preferably 0.5 to 8 parts by mass, and most preferably 1 to 5 parts by mass, all with respect to 100 parts by mass of the water absorbent resin.

Examples of the hydrophilic organic solvent include: alcohols such as ethyl alcohol, propyl alcohol, and isopropyl alcohol; ketones such as acetone; ethers such as dioxane, alkoxy(poly)ethyleneglycol, and tetrahydrofuran; amides such as ε-caprolactam; and sulfoxides such as dimethylsulfoxide. The amount of hydrophilic organic solvent used is preferably within a range of 0 to 10 parts by mass, more preferably 0 to 5 parts by mass, and most preferably 0 to 3 parts by mass, all with respect to 100 parts by mass of the water absorbent resin.

The method of mixing the surface crosslinking agent is not limited to a particular method. For example, the surface crosslinking agent may be mixed with the water absorbent resin by separately dissolving the surface crosslinking agent with water and a hydrophilic organic solvent. Alternatively, the surface crosslinking agent may be mixed by dissolving the surface crosslinking agent in water and a hydrophilic organic solvent together. Further, the surface crosslinking agent in water and/or a hydrophilic organic solvent may be mixed with the water absorbent resin in separate doses. It is, however, preferable that the surface crosslinking agent is first mixed with the solvent (water and/or hydrophilic organic solvent), and then added to the water absorbent resin in the form of an aqueous solution.

The surface crosslinking agent may additionally be mixed with an inorganic powder, water-insoluble fine particles, a surfactant, or a hydrophilic or hydrophobic polymer, so long as the particulate water absorbent of the present invention remains effective.

Among these different mixing methods, it is preferable that the surface crosslinking agent optionally dissolved in water and/or hydrophilic organic solvent is mixed dropwise with the water absorbent resin. More preferably, the surface crosslinking agent optionally dissolved in water and/or hydrophilic organic solvent is sprayed into the water absorbent resin. The mixture is atomized to preferably 0.01 to 300 µm, and more preferably 0.01 to 200 µm. The temperature of the solution to be sprayed is preferably in a range of 0° C. to the boiling point of the solution, more preferably 5 to 50° C., and most preferably 10 to 30° C., taking into consideration ease of mixing and stability. The temperature of the water absorbent resin powder before mixing is preferably in a range of 0 to 80° C., and more preferably 40 to 70° C., taking into consideration ease of mixing.

The type of mixer used in mixing is not particularly limited as long as it can generate power that is strong enough to attain uniform mixing. Examples of such a mixer include a cylindrical mixer, double-wall cone-shaped mixer, high-speed stirring mixer, wedge-shaped mixer, ribbon mixer, screw mixer, fluidized furnace rotary disk mixer, air mixer, two-arm kneader, inner mixer, pulverizing kneader, rotary mixer, and screw extruder.

When heating is carried out in the mixing step, heating is carried out preferably for 1 to 180 minutes, more preferably 3 to 120 minutes, and most preferably 5 to 100 minutes. The heating temperature (defined by the temperature of a heated medium or material) is preferably in a range of 100 to 250° C., more preferably 140 to 220° C., further preferably 150 to 230° C., and most preferably 160 to 220° C.

The heating may be carried out using a common dryer or furnace, examples of which include a trenched mixing dryer, rotary dryer, disk dryer, fluidized bed dryer, air dryer, and infra-red dryer.

In the surface modification carried out in the manufacturing process of the water absorbent resin of the present invention, additives such as an inactive surfactant, inactive deodorant, and inactive inorganic fine particles may be added with or without introducing surface-crosslinkage. Here, "inactive" means that the additives are substantially non-reactive to the water absorbent resin. Preferably, the surfactant and inactive inorganic fine particles are inorganic or organic fine particles or fatty acid (e.g., long-chain fatty acid or its salt), as will be described later. Preferably, these substances are added at the time of making the surface crosslinkage or at a different time.

In the present invention, a cationic polymer compound used as an additive for the surface modification of the water absorbent resin is added to improve properties of the water absorbent resin, for example, such as ease of anchoring to a sanitary article. A mass-average molecular weight of the cationic polymer compound is preferably 2,000 to 1,000,000, more preferably 5,000 to 500,000, and most preferably 10,000 to 500,000. An organic compound used as an additive for the surface modification of the water absorbent resin is a fatty acid or its salt, and preferably a long-chain fatty acid or its salt.

The cationic polymer compound is added either directly or in the form of a solution (aqueous solution). Preferable examples of the cationic polymer compound are polyethyleneimine, polyvinylamine, polyarylamine, a condensate of polyamidoamine and epichlorohydrin, polyamidine, a partial hydrolysate of poly(N-vinylformaldehyde), and salts of these compounds.

In the present invention, with the use of water-insoluble fine particles as an additive, it possible to improve permeability of the water absorbent resin, and blocking resistance of the water absorbent resin when it has absorbed moisture. As the water-insoluble fine particles, organic or inorganic water-insoluble fine particles may be adopted with an average particle size of preferably 0.0001 to 10 μm in diameter, more preferably 0.001 to 1 μm in diameter, and even more preferably 0.001 to 0.1 μm in diameter (the diameter of the particles is measured by using a coulter counter, for example). More specifically, silicon oxide (product name: Aerosil made by Nippon Aerosil Co., Ltd.), titanium oxide, or aluminum oxide may be used as the water-insoluble fine particles. Mixing is carried out by a method such as dry-blending or slurry blending.

The amount of water-insoluble fine particles used is preferably not less than 10 parts by mass, more preferably 0.001 to 5 parts by mass, and most preferably 0.01 to 2 parts by mass, all with respect to 100 parts by mass of the water absorbent resin.

[Manufacturing Process of Particulate Water Absorbent]

The following processes 1 through 3 are preferable examples of a manufacturing process of the particulate water absorbent according to the present invention.

[Process 1]

A polyacrylic acid (salt)-crosslinked polymer (water absorbent resin) is prepared in the foregoing manner, preferably by using a water-soluble unsaturated monomer containing a reduced amount of protoanemonin in the presence of methoxyphenol. The water absorbent resin so prepared is adjusted to a particle size of a specific range as defined above, and to an absorbency against no pressure (60 minute value) of 15 to 27 g/g for an aqueous solution of 0.90 mass percent sodium chloride. The water absorbent resin is then subjected to surface modification, preferably through surface crosslinkage, so as to form a particulate water absorbent of the present invention with an absorbency against no pressure (60 minute value) in a range of generally 10 to 27 g/g, preferably 12 to 27 g/g, more preferably 15 to 27 g/g, further preferably 17 to 27 g/g, and even more preferably 18 to 22 g/g, all with respect to the aqueous solution of 0.90 mass percent sodium chloride.

[Process 2]

A polyacrylic acid (salt)-crosslinked polymer (water absorbent resin) is prepared in the foregoing manner, preferably by using a water-soluble unsaturated monomer containing a reduced amount of protoanemonin in the presence of methoxyphenol. The water absorbent resin is then adjusted to a particle size of a specific range as defined above, and to a specific absorbency against no pressure (defined later) (a value after 60 minutes) of generally 10 g/g to 27 g/g, preferably 12 g/g to 27 g/g, more preferably 15 g/g to 27 g/g, further preferably 17 g/g to 25 g/g, and even more preferably 18 g/g to 22 g/g, all with respect to an aqueous solution of 0.90 mass percent sodium chloride. Thereafter, the surface of the water absorbent resin, with its particle size and absorbency (60 minute value against no pressure) adjusted, is coated with inorganic fine particles according to the specific range as defined above, so as to form a particulate water absorbent of the present invention.

[Process 3]

A polyacrylic acid (salt)-crosslinked polymer (water absorbent resin) is prepared in the foregoing manner, preferably by using a water-soluble unsaturated monomer containing a reduced amount of protoanemonin in the presence of methoxyphenol. The water absorbent resin is then adjusted to a particle size of a specific range as defined above, and to a specific absorbency against no pressure (a value after 60 minutes) of 17 g/g to 25 g/g, and preferably from 18 g/g to 22 g/g, with respect to an aqueous solution of 0.90 mass percent sodium chloride. Thereafter, the surface of the water absorbent resin, with its particle size and absorbency (60 minute value against no pressure) adjusted, is coated with a fatty acid or its salt, so as to form a particulate water absorbent of the present invention.

It is preferable that the particulate water absorbents obtained by coating the surface of the water absorbent resin according to the foregoing processes 2 and 3 are crosslinked, so that the absorbency against no pressure (60 minute value) with respect to an aqueous solution of 0.90 mass percent sodium chloride is adjusted to generally 10 to 27 g/g, preferably 12 to 27 g/g, more preferably 15 to 27 g/g, further preferably 17 to 25 g/g, and even more preferably 18 to 22 g/g, all with respect to the aqueous solution of 0.90 mass percent sodium chloride.

As used herein, "absorbency against no pressure (60 minute value) with respect to an aqueous solution of 0.90 mass percent sodium chloride" refers to an absorbency of the particulate water absorbent (water absorbent resin) when the particulate water absorbent is impregnated with an aqueous solution of 0.90 mass percent sodium chloride for 60 minutes against no pressure. Here, the 0.90 mass percent sodium chloride aqueous solution is used in excess so that it will not be completely absorbed by the particulate water absorbent.

As one can easily imagine, conventional water absorbents (water absorbent resins) offer high absorbency. In fact, the absorbency of mainstream products currently available in the market is in a range of generally not less than 30 g/g, preferably not less than 35 g/g, and more preferably not less than 40 g/g. Despite this trend, the present invention in providing a novel particulate water absorbent daringly confines the absorbency against no pressure of the water absorbent resin within a range below that of the conventional water absorbent resins.

Further, it is preferable that the water absorbent of the present invention after surface treatment has an absorbency against pressure (60 minute value) in a range of 15 to 27 g/g or preferably 17 to 25 g/g for an aqueous solution of 0.90 mass percent sodium chloride, as with the conventional water absorbent. As used herein, "absorbency against pressure (60 minute value) with respect to an aqueous solution of 0.90 mass percent sodium chloride" refers to an absorbency of the particulate water absorbent (water absorbent resin) when the particulate water absorbent is impregnated with (in contact with) an aqueous solution of 0.90 mass percent sodium chloride for 60 minutes against a pressure of 4.83 kPa.

The absorbency of the particulate water absorbent is controlled by suitably controlling the quantity of surface-treatment agent and/or reaction conditions, etc. Accordingly, the crosslink density of the water absorbent resin is adjusted during polymerization, preferably before the surface treatment, so that an absorbency of 40 g/g to 15 g/g, 35 g/g to 16 g/g, or 30 g/g to 17 g/g is attained for an aqueous solution of 0.9 mass percent sodium chloride against no pressure. In addition, the particle size of the water absorbent resin before the surface treatment is controlled to fall in the specific range as defined above.

[Water Absorbent of the Present Invention]

The particulate water absorbent of the present invention so obtained has a superior property in that its absorbency against pressure (AAP) hardly depends upon the salt concentration of the absorbed liquid even against a high pressure of 4.83 kPa. More specifically, in practical use, the water absorbent of the present invention delivers a constant performance in terms of absorbing power regardless of the salt concentration of urine. In other words, the water absorbing properties of the water absorbent remain at desirable levels regardless of changes in salt concentration that occur in a diaper or when the diaper is used.

The particulate water absorbent of the present invention contains a water absorbent resin as a main component, the water absorbent resin being a crosslinked polymer of a water-soluble unsaturated monomer. The particulate water absorbent includes a particulate water absorbent resin having a particle size in a range of not less than 106 μm (preferably not less than 150 μm) and less than 850 μm in an amount of 90 to 100 mass percent with respect to the total mass of the water absorbent resin contained in the particulate water absorbent. More preferably, the particulate water absorbent includes a particulate water absorbent resin having a particle size in a range of not less than 150 μm and less than 850 μm in an amount of not less than 95 mass percent, or more preferably not less than 98 mass percent, with respect to the total mass of the water absorbent resin contained in the particulate water absorbent (may be referred to as simply "particles" hereinafter). The mass-average particle size of the particulate water absorbent resin is preferably in a range from 200 to 700 μm, more preferably 300 to 600 μm. Among these different ranges, a range of 350 to 550 μm is particularly preferable, and 400 to 500 μm is most preferable.

The amount of particles less than 150 μm should not be contained exceeding 10 mass percent because it inhibits diffusivity of the body fluid such as blood or urine into the water absorbent. Another reason is that it increases the area of contact with air when the water absorbent is used as an absorbent, with the result that the particulate water absorbent is easily solubilized. Further, the amount of particles exceeding 850 μm should not be contained exceeding 10 mass percent because it slows the rate of water uptake by the water absorbent.

Further, in addition to a particle size of the defined range, the particulate water absorbent of the present invention has a constant absorbency against pressure regardless of the salt concentration. In the present invention, the absorbency against pressure is defined as the absorbency for the solutions of different salt concentrations (aqueous solutions of 0 to 0.90 mass percent sodium chloride) measured after a predetermined time period against a pressure of 4.83 kPa. The absorbency against pressure so defined was found to be most suitable for responding to changes in concentration of the body fluid such as urine in actual applications.

More specifically, in addition to a particle size of the defined range, the water absorbent of the present invention has a first salt concentration absorption index of not less than 0.60 as measured by formula (1) below when ion exchange water is used as an aqueous solution of a constant salt concentration:

(salt concentration absorption index)=(absorbency for an aqueous solution of a constant salt concentration against a pressure of 4.83 kPa)/(absorbency for an aqueous solution of a constant salt concentration against no pressure)       (1), where the numerator is the absorbency against a pressure of 4.83 kPa when the particulate water absorbent is impregnated with (in contact with) the aqueous solution of a constant salt concentration for 60 minutes, and the denominator is the absorbency against no pressure when the particulate water absorbent is impregnated with an excess amount of the aqueous solution of a constant salt concentration for 60 minutes.

The first salt concentration index is preferably not less than 0.70, more preferably not less than 0.80, further preferably not more than 0.90, and even more preferably not less than 0.95. A first salt concentration absorption index of less than 0.60 is not preferable because in this case the absorbency against pressure of the water absorbent resin for the aqueous solution of a particular salt concentration varies (fluctuates) widely in response to changes (decrease) in salt concentration of the urine or changes (decrease) in salt concentration caused by a diffusion of the urine through a diaper. In this case, it is difficult to ensure sufficient performance in practical use. The same phenomenon also occurs when the first salt concentration absorption index has an excessively high upper limit. Accordingly, the upper limit of the first salt concentration absorption index is preferably not more than 1.20, or more preferably not more than 1.10. (It should be noted that an index of 0.60 is the same as saying 0.600. As such, when describing values of salt concentration absorption index or salt tolerance index, only the first two digits to the right of the decimal point are given.)

Further, in addition to a particle size and first salt concentration absorption index of the defined ranges, the particulate water absorbent of the present invention should preferably have other properties as defined below, so as to ensure stable urine absorption in response to changes (decrease) in salt concentration of the urine or changes (decrease) in salt concentration caused by a diffusion of the urine through a diaper.

Specifically, the particulate water absorbent of the present invention preferably has a second salt concentration absorption index of not less than 0.80 as measured by the foregoing formula 1, wherein the second salt concentration absorption index is the salt concentration absorption index when the aqueous solution of a constant salt concentration is an aqueous solution of 0.1 mass percent sodium chloride. The second salt concentration index is more preferably not less than 0.90, further preferably not less than 0.95. The upper limit of the second salt concentration index is generally not more than 1.20, and preferably not more than 1.10.

Further, in addition to a particle size and first salt concentration absorption index of the defined ranges, the particulate water absorbent of the present invention preferably has third, fourth, fifth, and sixth salt concentration absorption indices as measured by the foregoing formula (1) when the aqueous solution of a constant salt concentration is 0.30 mass percent, 0.50 mass percent, 0.70 mass percent, and 0.90 mass percent sodium chloride water, respectively, wherein at least one of the third, fourth, fifth, and sixth salt concentration absorption indices is not less than 0.90. These third through sixth salt concentration absorption indices are preferably not less than 0.95, and the upper limit thereof is generally not more than 1.20, and preferably not more than 1.10.

Further, in addition to a particle size and first salt concentration absorption index of the defined ranges, the particulate water absorbent of the present invention preferably has a mean salt concentration absorption index of not less than 0.90 as measured by taking a mean of the third, fourth, fifth, and sixth salt concentration absorption indices. More preferably, the mean salt concentration absorption index is not less than 0.95, and the upper limit thereof is generally not more than 1.20, and preferably not more than 1.10. Further, the mean salt concentration absorption index has a standard deviation preferably in a range of 0 to 0.100, and more preferably 0 to 0.50.

Further, in addition to a particle size and first salt concentration absorption index of the defined ranges, the particulate water absorbent of the present invention has a first salt tolerance index of not less than 0.40 as measured by a formula (2) below when an aqueous solution of 0.10 mass percent sodium chloride is used as the aqueous solution of a constant salt concentration:

(salt tolerance index)=(absorbency for an aqueous solution of a constant salt concentration against no pressure)/(absorbency for ion exchange water against no pressure)     (2), where the numerator is the absorbency against no pressure when the particulate water absorbent is impregnated with an excess amount of the aqueous solution of a constant salt concentration for 60 minutes, and the denominator is the absorbency against no pressure when the particulate water absorbent is impregnated with ion exchange water for 60 minutes. The lower limit of the first salt tolerance index is preferably not less than 0.50, and the upper limit is generally not more than 1.20, and preferably not more than 1.10.

The particulate water absorbent of the present invention has an absorbency against no pressure in a defined range (15 g/g to 27 g/g). For an aqueous solution of 0.90 mass percent sodium chloride, the absorbency (60 minute value) is 10 g/g to 27 g/g, preferably 12 g/g to 27 g/g, more preferably 15 g/g to 27 g/g, further preferably 17 g/g to 25 g/g, and even more preferably 18 g/g to 22 g/g.

Further, the particulate water absorbent of the present invention preferably has a Gel Permeability Index (GPI, unit: $10^{-7} \times cm^3 \times s \times g^{-1}$, the unit will be omitted hereinafter) of not less than 10. As a result of intensive study on various problems of conventional water absorbents, the inventors of the present invention have found that the gel permeability index (GPI) of the conventional water absorbents is greatly reduced with increase in salt concentration (change in salt concentration caused by the conditions of a surrounding environment or by the ion exchange or movement of liquid in an absorbent) or pressure (change in pressure by the weight or posture of the person using an absorbent). This was found to be detrimental to the permeability of a swollen absorbent for an absorbed solution such as urine. On the other hand, the particulate water absorbent of the present invention ensures stable gel permeability regardless of changes in salt concentration or pressure. Therefore, with the particulate water absorbent of the present invention, a solution can sufficiently permeate through the absorbent (area of diffusion is increased). In addition, the absorbent can absorb more solution, preventing leakage of the liquid. The value of GPI is preferably not less than 15, and more preferably not less than 20. The GPI will be described in more detail in Examples below.

In the particulate water absorbent of the present invention, the GPI for ion exchange water against a pressure of 2.07 kPa is not less than 10, preferably not less than 15, and more preferably not less than 20. The GPI in these ranges is considerably higher than the GPI of conventional absorbents ranging from 0 to 1, and does not decrease as much with increase in pressure. Further, in the particulate water absorbent of the present invention, the GPI for an aqueous solution of 0.3 to 0.9 mass percent sodium chloride against 2.07 kPa is not less than 10, preferably not less than 20, more preferably not less than 50, further preferably not less than 100, and even more preferably not less than 150. The GPI in these ranges is considerably higher than the GPI of conventional absorbents ranging from 0 to several tens, and does not decrease as much with increase in salt concentration. Further, in the particulate water absorbent of the present invention, the GPI for an aqueous solution of 0.7 mass percent sodium chloride against 4.83 kPa is not less than 10, preferably not less than 15, and more preferably not less than 20. The GPI in these ranges is considerably higher than the GPI of conventional absorbents ranging from 0 to 1, and does not decrease as much with increase in salt concentration. Particularly, the GPI for an aqueous solution of 0.3 to 0.9 mass percent sodium chloride against 2.07 kPa shows only a small change and is stable in a range of not less than 150. As noted above, the particulate water absorbent of the present invention has a stable and high GPI regardless of changes in salt concentration or pressure, thus ensuring superior absorbing performance (increased area of diffusion, fast absorption rate) when used as an absorbent in actual applications.

Further, the particulate water absorbent of the present invention has superior water absorbing power with an absorbency (60 minute value) of not less than 50 g/g, preferably not less than 60 g/g, and more preferably not less than 70 g/g for ion exchange water against a pressure of 4.83 kPa. It should be noted here that the absorbency against pressure can have a non-limiting upper limit and should preferably have a high value. Considering manufacturing cost and other economic factors, the upper limit of absorbency against pressure is preferably 200 g/g, and more preferably 150 g/g.

Accordingly, the present invention provides a novel particulate water absorbent as below. The particulate water absorbent contains a water absorbent resin as a main component, the water absorbent resin being a crosslinked polymer of a water-soluble unsaturated monomer. The water absorbent resin is particular in shape and contains particles of a particle size in a range of not less than 106 μm and less than 850 μm in an amount of not less than 90 mass percent with respect to the total mass of the water absorbent resin contained in the particulate water absorbent. The particulate water absorbent has an absorbency against pressure of not less than 50 g/g as measured by impregnating the particulate water absorbent with ion exchange water for 60 minutes against a pressure of 4.83 kPa. The particulate water absorbent surpasses conventional water absorbents in terms of absorbing power for ion exchange water, the absorbing power being particularly strong at low salt concentrations. Preferably, the particulate water absorbent of the present invention is defined by the salt concentration absorption index, salt tolerance index, mean salt concentration absorption index and its standard deviation, and gel permeability index.

[Other Additives]

In addition to the additives used for the surface crosslinkage in a surface treatment, other additives (denoted as "other additives" hereinafter) may be added a required. Examples of such other additives include: deodorant agents; antibacterial agents; fragrant material; foaming agents; pigment; dye; hydrophilic staple fibers; plasticizers; adhesives; surfactants; fertilizer; oxidants; reductants; water; salt; chelators; disinfectants; hydrophilic polymers such as polyethylene glycol and polyethylene imine; hydrophobic polymers such as paraffin; thermo-plastic resins such as polyethylene and polypropylene; and thermo-setting resins such as polyester resin and urea resin. These additives may be added in an adding step to impart various functions to the water absorbent resin. Preferably, these additives are added to the surface of the water absorbent resin in the adding step.

These additives are used in an amount of generally 0 to 30 mass percent, preferably 0 to 10 mass percent, and more preferably 0 to 1 mass percent, all with respect to 100 mass percent of the water absorbent resin.

[Use of Water Absorbent]

The particulate water absorbent of the present invention delivers stable absorbing power regardless of salt concentration. This makes the particulate water absorbent applicable to a wide range of fields as an agricultural or horticultural water retainer, industrial water retainer, desiccant, dehumidifying agent, or building material. However, the water absorbent is particularly suitable for sanitary articles as represented by paper diapers and sanitary napkins for absorbing body fluids, including feces, urine, and blood.

The properties of the particulate water absorbent of the present invention are stable and well balanced. This enables the particulate water absorbent to be used as a sanitary absorbent article at a high concentration (weight ratio of water absorbent resin with respect to the total weight of water absorbent resin and fiber material) as defined by a core concentration ratio in formula (3) below, preferably in a range of 30 to 100 mass percent, more preferably 40 to 100 mass percent, and further preferably 50 to 95 mass percent.

(core concentration)=(mass of particulate water absorbent)/(mass of particulate water absorbent)+(mass of fiber material) (3)

An absorbent material (composite of absorbing core and water absorbent) may be incorporated in a sanitary article in any form. For example, the absorbent material may have a sandwich construction in which a water absorbent is placed between sheets of hydrophilic fiber material, or a blend construction in which a water absorbent is mixed with hydrophilic fiber material.

EXAMPLES

The present invention will be described in more detail below referring to Examples and Comparative Examples. It should be appreciated, however, that the present invention is not just limited to the particular forms described below. Further, as the term is used herein, "part" refers to "part by mass (weight)" unless otherwise specified.

Note that, measurements were carried out at an air temperature and liquid temperature of 25° C.±1° C., and under atmospheric pressure and a relative humidity of below 50 percent, unless otherwise specified.

Further, in measuring the aforementioned parameters of the water absorbent or water absorbent resin (described later), the measurement was generally performed by using the water absorbent or water absorbent resin without any modification. However, in case where the water absorbent or water absorbent resin has excessively absorbed moisture, that is, in case of a water absorbent or water absorbent resin taken from an absorbent article such as a diaper, the measurement was performed after the following steps: the water absorbent or water absorbent resin was suitably dried, for example, under reduced pressure, so that it had a constant mass at 60° C. for example, and its moisture content was adjusted to not more than 7±1 mass percent, more preferably not more than 5±1 mass percent.

<Preparation of Solutions>

In order to evaluate absorption properties of the water absorbent resin and water absorbent (particulate water absorbent), the present invention used ion-exchange water and aqueous solutions of sodium chloride having different salt concentrations.

Solution S0: ion-exchange water
Solution S1: aqueous solution of 0.10 mass (weight) percent sodium chloride
Solution S2: aqueous solution of 0.20 mass (weight) percent sodium chloride
Solution S3: aqueous solution of 0.30 mass (weight) percent sodium chloride
Solution S4: aqueous solution of 0.40 mass (weight) percent sodium chloride
Solution S5: aqueous solution of 0.50 mass (weight) percent sodium chloride
Solution S6: aqueous solution of 0.70 mass (weight) percent sodium chloride
Solution S7: aqueous solution of 0.90 mass (weight) percent sodium chloride <Absorbency (Absorbency Against no Pressure for 60 Minutes (GV, Gel Volume))>

0.20 g of water absorbent resin (or water absorbent) was uniformly placed in a bag of non-woven cloth (60 mm×60 mm), and the bag was immersed in each of the solutions S0 through S7 used in excess (at least 100 g). After 60 minutes, the bag was taken out and water was removed from the bag for 3 minutes at 250 G using a centrifugal separator. After the removal of water, weight W2 (g) of the bag was measured.

Note that, when the water absorbent resin (or water absorbent) has a large swelling factor with the weight W2 (g) of the bag exceeding 15 (g), the dose of water absorbent resin (or water absorbent) in the bag was suitably adjusted to not more than 0.20 g. Specifically, for the solutions S0 through S3, the dose of water absorbent resin (or water absorbent) was set to 0.01 to 0.05 g. Similarly, the dose was 0.05 to 0.15 for the solutions S4 and S5, and 0.10 to 0.20 g for the solutions S6 and S7. In this way, the weight W2 (g) of the bag was adjusted to 5 to 15 (g).

The same process was carried out with an empty bag containing no water absorbent resin or water absorbent, and weight W1 (g) of the empty bag was measured. Then, the following formula (4) was solved to obtain absorbency (g/g), using the measured values of weight W1 and weight W2:

$$\text{Absorbency (g/g)} = \frac{(\text{Weight } W2 \text{ (g)} - \text{Weight } W1 \text{ (g)})}{\text{Weight of water absorbent resin (or water absorbent) (g)}} \quad (4)$$

<Absorbency Against Pressure (AAP)>

A stainless-steel 400-mesh standard sieve (mesh size of 38 μm) was fused on the bottom of a plastic support cylinder having an inner diameter of 60 mm, and 0.9000 g of water absorbent resin or water absorbent was uniformly sprinkled on the sieve. A piston with an outer diameter slightly smaller than 60 mm, sized to fit inside the support cylinder with no clearance but with a free vertical stroke within the cylinder was prepared. The piston was adjusted in such a manner that a load of 4.83 kPa (0.7 psi) could be uniformly applied on the water absorbent resin or water absorbent. The piston and the load were placed in this order on the water absorbent resin or water absorbent, and the total mass Wa (g) of this measuring device was measured. Then, a glass filter having a diameter of 90 mm (made by Sougo Rikagaku Garasu Seisakusho Co., Ltd.; pore diameter of 100 μm to 120 μm) was placed inside a Petri dish having a diameter of 150 mm, and each solution was added to the level of the upper surface of the glass filter.

On the glass filter, a piece of filter paper having a diameter of 90 mm (made by ADVANTEC Toyo Kaisha, Ltd.; product name: (Qualitative Filter Paper, JIS P 3801, No. 2); 0.26 mm thick; minimum opening diameter of 5 μm) was placed to completely wet the filter paper, and an excess solution was removed.

The measuring device was then placed on the wet filter paper to absorb the contacted solution under pressure. After 1 hour, the measuring device was lifted and a weight Wb (g) of the measuring device was measured. From the values of Wa and Wb so measured, an absorbency against pressure (g/g) was calculated using the following formula (5):

$$\text{Absorbency against pressure (g/g)} = \frac{(Wb \text{ (g)} - Wa \text{ (g)})}{\text{Mass of water absorbent resin or water absorbent (0.9000 g)}} \quad (5)$$

<Salt Concentration Absorption Index>

The salt concentration absorption index of the present invention was calculated according to the formula (1) below based on the measured absorbencies of the solution (S0, S1-S7) against pressure and against no pressure.

$$\text{Salt concentration absorption index} = \frac{\text{Absorbency against pressure of 4.83 kPa for an aqueous solution of a constant salt concentration}}{\text{Absorbency against no pressure for an aqueous Solution of a constant salt concentration}} \quad (1)$$

where "absorbency against pressure" is the absorbency against a pressure of 4.83 kPa when the water absorbent resin or water absorbent is immersed in (in contact with) an aqueous solution of a constant salt concentration for 60 minutes, and "absorbency against no pressure" is the absorbency against no pressure when the water absorbent resin or water absorbent is immersed in an excess amount of an aqueous solution of a constant salt concentration for 60 minutes.

As used herein, a first salt concentration absorption index is the salt concentration absorption index when ion exchange water is used as the aqueous solution of a constant salt concentration in formula (1) above. Similarly, a second salt concentration absorption index is the salt concentration absorption index when an aqueous solution of 0.10 mass percent sodium chloride is used as the aqueous solution of a constant salt concentration in formula (1). A third salt concentration absorption index is the salt concentration absorption index when an aqueous solution of 0.30 mass percent sodium chloride is used as the aqueous solution of a constant salt concentration in formula (1). A fourth salt concentration absorption index is the salt concentration absorption index when an aqueous solution of 0.50 mass percent sodium chloride is used as the aqueous solution of a constant salt concentration in formula (1). A fifth salt concentration absorption index is the salt concentration absorption index when an aqueous solution of 0.70 mass percent sodium chloride is used as the aqueous solution of a constant salt concentration in formula (1). A sixth salt concentration absorption index is the salt concentration absorption index when an aqueous solution of 0.90 mass percent sodium chloride is used as the aqueous solution of a constant salt concentration in formula (1).

<Salt Tolerance Index>

Based on the measured absorbency against no pressure, a salt tolerance index was found by the following formula (2).

$$\text{Salt tolerance index} = \frac{\text{Absorbency against no pressure for an aqueous solution of a constant salt concentration}}{\text{Absorbency against no pressure for ion exchange water}}, \quad (2)$$

where "absorbency against no pressure" is the absorbency when the water absorbent resin or water absorbent is immersed in an excess amount of an aqueous solution of a constant salt concentration for 60 minutes. Here, a first salt tolerance index is the salt tolerance index when an aqueous solution of 0.10 mass percent sodium chloride is used as an aqueous solution of a constant salt concentration in formula (2) above.

<Weight (Mass) Average Particle Diameter>

The water absorbent resin or water absorbent was sieved with a JIS standard sieve of various mesh sizes, including 850 μm, 710 μm, 600 μm, 500 μm, 425 μm, 300 μm, 212 μm, 150 μm, 106 μm, and 75 μm, and the percentage of residual particles was plotted on logarithmic probability paper. The graph gave weight average particle diameter (D50).

Sieving was carried out by placing 10.00 g of water absorbent resin powder or water absorbent in JIS standard sieves (IIDA TESTING SIEVE: inner diameter of 80 mm) of different sizes, including 850 μm, 710 μm, 600 μm, 500 μm, 425 μm, 300 μm, 212 μm, 150 μm, 106 μm, and 75 μm, and by classifying the water absorbent resin powder or water absorbent for 10 minutes using a low-tap sieve shaking apparatus (ES-65 sieve shaking apparatus made by Iida Seisakusho Co., Ltd.). Note that, as the term is used herein, "weight average particle diameter (D50)" is the size of a sieve with which 50 weight percent of particles with respect to the total weight of the water absorbent resin or water absorbent particles were classified when they are classified for 10 minutes using the sieve shaking apparatus, as described in U.S. Pat. No. 5,051,259.

<Water-Soluble Content (Soluble Amount)>

184.3 g of 0.50 mass percent sodium chloride aqueous solution was measured to a 250 ml plastic container equipped with a lid. Then, in order to extract a soluble content, 1.00 g of water absorbent resin or water absorbent was added to the aqueous solution, and the resulting mixture was stirred (at 250 to 350 rpm, for example) with a magnetic stirrer for 16 hours using a stirring vane having a 40 mm length and a 8 mm diameter (for example, stirring vane A, product of Sougo Rikagaku Glass Seisakusho Co., Ltd.) so that a depth of its whirlpool was approximately 2 cm. The extract was filtered through a piece of filter paper (made by ADVANTEC Toyo Kaisha, Ltd.; product name: (Qualitative Filter Paper, JIS P 3801, No. 2); 0.26 mm in thickness; minimum opening diameter of 5 μm), and 50.0 g of filtrate was measured out as a measurement solution.

Then, a saline solution containing no water absorbent resin or water absorbent was titrated to a pH of 10 using a 0.1 N NaOH aqueous solution. Thereafter, the saline solution was titrated to a pH of 2.7 using a 0.1 N HCl aqueous solution. The titration gave blank titers ([bNaOH]mL, [bHCl]mL).

The same titration was carried out using the measurement solution to obtain titers ([NaOH]mL, [HCl]mL).

Thereafter, a soluble content of the water absorbent resin or water absorbent was calculated from the blank titers and the titers of the measurement solution. For example, for a water absorbent resin or water absorbent containing a known amount of acrylic acid and its salt (sodium acrylate), the soluble amount can be calculated from the formula (6.1) below, using the average molecular weight of the acrylic acid (sodium acrylate) monomer, and the titers as determined above.

$$\text{Soluble amount (wt. \%)} = \frac{0.1 \times \text{Average molecular weight} \times 184.3 \times 100 \times ([\text{HCl}] - [b\text{HCl}])}{1000/1.0/50.0} \quad (6.1)$$

For a water absorbent resin or water absorbent of an unknown content amount, the average molecular weight of the monomer is calculated first by determining a neutralization ratio according to formula (6.2) below, using the measured titer values. From the average molecular weight of the monomer so calculated, the soluble content of the water absorbent resin or water absorbent is calculated from the formula (6.1) above.

$$\text{Neutralization ratio (mol. \%)} = \left(1 - \frac{[\text{NaOH}] - [b\text{NaOH}]}{[\text{HCl}] - [b\text{HCl}]}\right) \times 100 \quad (6.2)$$

<Performance Evaluation of Absorbent Article (Test Using Kewpie Doll®)>

An absorbent article used for a performance evaluation was produced in the following manner. First, 50 parts by weight of water absorbent resin (water absorbent) obtained in Examples and Comparative Examples described later was dry-mixed with 50 parts by weight of comminuted wood pulp using a mixer. The mixture was made into a 120 mm×400 mm web on a wire screen of 400-mesh (mesh size of 38 μm) with a batch-type air molding device. Then, the web was pressed against a pressure of 2 kg/cm² (196.14 kPa) for 5 seconds. As a result, an absorbent material having a basis weight of approximately 0.047 g/cm² was obtained.

Subsequently, a back sheet (liquid impermeable sheet) having a leg gather made of impermeable polypropylene, the absorbent material, and a top sheet (liquid permeable sheet) made of liquid permeable polypropylene were laminated in this order using a double-faced tape. Then, two tape fasteners were attached to the laminate to obtain an absorbent article (i.e., paper diaper).

The absorbent article was put on a Kewpie Doll® (55 cm tall and 5 kg in weight), and the Kewpie Doll® was laid face down. Then, a tube was inserted between the absorbent article and the Kewpie Doll®, and the solution (S0-S7) was supplied through the tube to an area where urine is expected to hit. Here, the solution was supplied every 20 minutes, 50 ml each, after it was heated to 37° C., and the solution was added until the absorbent article could no longer absorb and leaked the solution. The amount of solution supplied up to this point was measured.

The measurement was repeated four times for each of the solutions S0 through S7, and an average of the four measured values was calculated. The average was calculated as the amount of solution (S0-S7) absorbed (QP absorption amount (g)). It was deemed in the evaluation that the greater the absorbed amount, the better the performance of the absorbent article.

After a supply of the solution, four sides of the absorbent article was fixed with an adhesive tape, and the top sheet of the absorbent article was cut and removed so that the absorbent article could be observed from the side the solution was supplied. Then, in order to diffusivity (%), a portion of absorbent material that has absorbed the solution was measured from the side the solution was supplied. The diffusivity (%) was calculated by dividing the used area of the absorbent material by the whole area of the absorbent material.

As described above, the amount of solution is measured four times to calculate a QP absorption amount. Accordingly, diffusivity (%) is calculated for each of the four measurements, and an average of four diffusivities (%) is calculated as QP diffusivity (%) for each of the solutions S0 through S7. It was deemed in the evaluation that the higher the QP diffusivity, the better the performance of the absorbent article.

<Gel Permeability Index/GPI>

Using a saline solution flow guiding test device described in International Publication WO9522356 (corresponding to Japanese Laid-Open Patent Publication No. 509591/1997 (Tokuhyouhei 9-509591)), a gel permeability index (GPI) was calculated with the ion-exchange water and sodium chloride aqueous solutions S0 through S7 used as a swelling solution and a permeating solution.

Specifically, a measuring device shown in FIG. 1 was used for the measurement of GPI. The measuring device includes: a tank 31 for containing a permeating solution 33; a cell 41 in which a solution is supplied to a gel layer 44 comprising a swelled water absorbent resin or water absorbent; a collecting container 48 for collecting the solution that has permeated through the gel; and an even balance 49 for measuring a weight of the collected solution.

Into the tank 31 is inserted a glass tube 32. The lower end of the glass tube 32 was positioned such that the permeating solution supplied to the cell 41 was maintained 5 cm above the bottom of the gel layer 44. A permeating solution 33 in the tank 31 is supplied to the cell 41 through an L-shaped tube 34 equipped with a valve 35.

The cell 41 is a container in which a permeating solution permeates through the gel layer 44 which comprises a swelled water absorbent resin or water absorbent. The cell 41 has an inner diameter of 6 cm, and includes a stainless-steel wire gauze 42 (No. 400, mesh size of 38 µm) at the bottom surface of the cell 41. The cell 41 also includes a piston 46 which is pressed against the surface of the gel layer 44. The piston 46 has holes 47 through its lower portion. The holes 47 are sized to pass the permeating solution. The lower portion of the piston 46 also has a glass filter 45 with excellent permeability to prevent a water absorbent resin or water absorbent, or its swelled gel from entering the holes 47. The cell 41 is placed on a table. The table is in contact with the cell 41, and comprises a stainless-steel metal gauze 43 so that the permeating solution can freely pass through the table.

The collecting container 48 for collecting the permeating solution is placed on the even balance 49 beneath the metal gauze 43 supporting the cell 41. The even balance measures a weight of the permeating solution that was collected by the collecting container 48.

The measuring device was used to measure GPI in the manner described below. A water absorbent resin or water absorbent (0.900 g) was charged to an even height in the cell 41. In the cell 41, the water absorbent resin or water absorbent was swelled with a swelling solution for 60 minutes against a predetermined pressure of (0.3 psi (2.07 kPa) or 0.7 psi (4.83 kPa)). Then, the height of the gel layer 44, which is a swelled and gelled water absorbent resin or water absorbent, was recorded. Thereafter, a permeating solution was supplied from the tank 31 at a constant hydrostatic pressure under the same applied pressure of swelling, so as to permeate the gel layer 44. Note that, the permeating solution used here is the same as the swelling solution used for swelling. For example, when the solution S0 is used for swelling, the solution S0 is used as a permeating solution.

Next, using a computer and a balance, the amount of permeating solution (g) passing through the gel layer 44 (FIG. 1) was recoded every 20 second as function of time for the duration of 10 minutes. The flow rate Fs(t) (g/s) of the permeating solution passing through the gel layer 44 (most of the permeating solution passes through the gel layer 44 between gel particles) is obtained by dividing the weight (g) of the permeating solution that has passed through the gel layer 44 within a predetermined period of time by this predetermined time(s).

The gel permeability index (GPI) was calculated from formula (7) below only using data (flow rate Fs(t)) that was obtained within a 10 minute time period in which the amount of permeating solution was recorded. The 10 minute time period was started from time ts, at which a stable hydrostatic pressure and a stable flow rate were obtained.

$$GPI = \frac{(F_s(t=0) \times L_0)}{(\rho \times A \times \Delta P)} \quad (7)$$

$$= \frac{(F_s(t=0) \times L_0)}{139506}$$

In formula (7), the value of Fs(t=0), which indicates the initial flow rate through the gel layer 44, is obtained by plotting the flow rate Fs(t) vs. time t (10 minutes after ts) and determining a value at t=0 by the extrapolation of the graph by the least-square method. In formula (7), $L_0$ is the height of the gel layer (cm), $\rho$ is the density of NaCl solution (g/cm$^3$), A is the upper area of the gel layer in the cell 41 (28.27 cm$^2$), and $\Delta P$ is the hydrostatic pressure applied to the gel layer (4920 dyne/cm$^2$). The unit of GPI is $10^{-7} \times cm^3 \times s \times g^{-1}$.

Reference Example 1

A solution (1) was prepared by dissolving 14.6 g of polyethylene glycol diacrylate (the average number of moles of ethylene oxide added was 8) in a 4500 g aqueous solution of sodium acrylate (monomer concentration of 39 weight percent) that had been neutralized to a neutralization ratio of 71.3 mole percent by mixing caustic soda with an acrylic acid containing a non-detectable (ND) amount (less than 1 ppm) of protoanemonin and furfural, and 50 ppm of p-methoxyphenol (with respect to the weight of acrylic acid).

The solution (1) was deaerated for 30 minutes in an atmosphere of nitrogen gas, and was fed to a reactor that had been prepared by placing a lid on a 10 L stainless-steel two-arm kneader equipped with two sigma vanes and a jacket. Inside the reactor was replaced with nitrogen gas while maintaining the temperature of the solution (1) at 30° C. Thereafter, an aqueous solution of 2.46 g sodium persulfate and 0.10 g L-ascorbic acid was added to the solution (1) with stirring. A polymerization reaction started about a minute later, and the reaction was allowed for 60 minutes at 30° C. to 90° C. so as to obtain a hydrogel crosslinked polymer (1).

The hydrogel crosslinked polymer (1) was obtained in pieces of about 5 mm in diameter. The pieces of hydrogel crosslinked polymer (1) were then sprinkled over a 50-mesh sieve (mesh size of 300 µm), and were dried thereon with hot air of 150° C. for 90 minutes. After drying, the hydrogel crosslinked polymer (1) was pulverized with a shaking mill, and was classified and blended through a 20-mesh sieve (mesh size of 850 µm). The product was water absorbent resin particles (a) of an irregularly crushed shape.

Reference Example 2

A solution (2) was prepared by dissolving 11.7 g of polyethylene glycol diacrylate (the average number of moles of ethylene oxide added was 8) in a 5200 g aqueous solution of sodium acrylate (monomer concentration of 39 weight percent) that had been neutralized to a neutralization ratio of 60.0 mole percent by mixing caustic soda with an acrylic acid containing a non-detectable amount of protoanemonin and furfural, and 50 ppm of p-methoxyphenol (with respect to the weight of acrylic acid).

The solution (2) was deaerated and charged to a reactor that had been prepared by placing a lid on a 10 L stainless-steel two-arm kneader equipped with two sigma vanes and a jacket, as in Reference Example 1. Inside the reactor was replaced with nitrogen gas at a maintained temperature of 30° C. Thereafter, an aqueous solution of 2.88 g sodium persulfate and 0.10 g L-ascorbic acid was added to the solution (2) with stirring. A polymerization reaction started about a minute later, and the reaction was allowed for 60 minutes at 30° C. to 90° C. so as to obtain a hydrogel crosslinked polymer (2) (obtained in pieces of about 5 mm in diameter). The product was dried as in Reference Example 1.

After drying, the hydrogel crosslinked polymer (2) was pulverized with a shaking mill, and was classified and blended through a 20-mesh sieve (mesh size of 850 µm). The product was water absorbent resin particles (b) of an irregularly crushed shape.

Reference Example 3

A solution (3) was prepared by dissolving 58.5 g of polyethylene glycol diacrylate (the average number of moles of ethylene oxide added was 8) in a 5650 g aqueous solution of sodium acrylate (monomer concentration of 37 weight percent) that had been neutralized to a neutralization ratio of 75.0 mole percent by mixing caustic soda with an acrylic acid containing a non-detectable amount of protoanemonin and furfural, and 50 ppm of p-methoxyphenol (with respect to the weight of acrylic acid).

The solution (3) was deaerated and charged to a reactor that had been prepared by placing a lid on a 10 L stainless-steel two-arm kneader equipped with two sigma vanes and a jacket, as in Reference Examples 1 and 2. Inside the reactor was replaced with nitrogen gas at a maintained temperature of 30° C. Thereafter, an aqueous solution of 2.88 g sodium persulfate and 0.10 g L-ascorbic acid was added to the solution (3) with stirring. A polymerization reaction started about a minute later, and the reaction was allowed for 60 minutes at 30° C. to 90° C. so as to obtain a hydrogel crosslinked polymer (3) (obtained in pieces of about 5 mm in diameter). The product was dried as in Reference Examples 1 and 2.

After drying, the hydrogel crosslinked polymer (3) was pulverized with a shaking mill, and was classified and blended through a 20-mesh sieve (mesh size of 850 μm). The product was water absorbent resin particles (c) of an irregularly crushed shape.

Reference Example 4

A solution (4) was prepared by dissolving 4.4 g of polyethylene glycol diacrylate (the average number of moles of ethylene oxide added was 8) in a 5330 g aqueous solution of sodium acrylate (monomer concentration of 33 weight percent) that had been neutralized to a neutralization ratio of 75.0 mole percent by mixing caustic soda with an acrylic acid containing a non-detectable amount of protoanemonin and furfural, and 50 ppm of p-methoxyphenol (with respect to the weight of acrylic acid).

The solution (4) was deaerated and charged to a reactor that had been prepared by placing a lid on a 10 L stainless-steel two-arm kneader equipped with two sigma vanes and a jacket, as in Reference Examples 1, 2 and 3. Inside the reactor was replaced with nitrogen gas at a maintained temperature of 30° C. Thereafter, an aqueous solution of 2.88 g sodium persulfate and 0.10 g L-ascorbic acid was added to the solution (4) with stirring. A polymerization reaction started about a minute later, and the reaction was allowed for 60 minutes at 30° C. to 90° C. so as to obtain a hydrogel crosslinked polymer (4) (obtained in pieces of about 5 mm in diameter). The product was dried as in Reference Examples 1, 2, and 3.

After drying, the hydrogel crosslinked polymer (4) was pulverized with a shaking mill, and was classified and blended through a 20-mesh sieve (mesh size of 850 μm). The product was water absorbent resin particles (d) of an irregularly crushed shape.

Reference Example 5

A solution (5) was prepared by dissolving 63.0 g of polyethylene glycol diacrylate (the average number of moles of ethylene oxide added was 8) in a 5650 g aqueous solution of sodium acrylate (monomer concentration of 37 weight percent) that had been neutralized to a neutralization ratio of 60.0 mole percent by mixing caustic soda with an acrylic acid containing a non-detectable amount of protoanemonin and furfural, and 50 ppm of p-methoxyphenol (with respect to the weight of acrylic acid).

The solution (5) was deaerated as in Reference Examples 1 through 4, and was charged to a reactor that had been prepared by placing a lid on a 10 L stainless-steel two-arm kneader equipped with two sigma vanes and a jacket, as in Reference Examples 1 through 4. Inside the reactor was replaced with nitrogen gas at a maintained temperature of 30° C. Thereafter, an aqueous solution of 2.88 g sodium persulfate and 0.10 g L-ascorbic acid was added to the solution (5) with stirring. A polymerization reaction started about a minute later, and the reaction was allowed for 60 minutes at 30° C. to 90° C. so as to obtain a hydrogel crosslinked polymer (5) (obtained in pieces of about 5 mm in diameter). The product was dried as in Reference Examples 1 through 4.

After drying, the hydrogel crosslinked polymer (5) was pulverized with a shaking mill, and was classified and blended through a 20-mesh sieve (mesh size of 850 μm). The product was water absorbent resin particles (e) of an irregularly crushed shape.

Reference Example 6

A water absorbent resin particles (f) of an irregularly crushed shape were obtained according to the procedure of Reference Example 4, except that 88.2 g of polyethylene glycol diacrylate (the average number of moles of ethylene oxide added was 8) was used.

Example 1

100 parts of the water absorbent resin (a) obtained in Reference Example 1 was mixed with a surface crosslinking agent containing 0.5 parts of propylene glycol, 0.3 parts of 1,4-butanediol, and 3 parts of water. The mixture was then heated at 220° C. for 90 minutes to obtain a water absorbent (1) that included a surface-treated water absorbent resin.

Example 2

Instead of the water absorbent resin (a), the water absorbent resin (b) obtained in Reference Example 2 was used according the procedure of Example 1, so as to obtain a water absorbent (2) that included a surface-treated water absorbent resin.

Example 3

A Lōdige mixer (product of Gebr, Lōdige Maschinenbau, GmbH, type M5R) was charged with 0.3 parts of hydrophilic silicon dioxide with respect to 100 parts of the water absorbent resin (c) obtained in Reference Example 3, so as to obtain a water absorbent (3) that included a surface-treated water absorbent resin.

Example 4

Instead of the hydrophilic silicon dioxide, calcium stearate was used according to the procedure of Example 3, so as to obtain a water absorbent (4) that included a surface-treated water absorbent resin.

Example 5

100 parts of the water absorbent resin (e) obtained in Reference Example 5 was mixed with a surface crosslinking agent containing 0.5 parts of propylene glycol, 0.3 parts of 1,4-butanediol, and 3 parts of water. The mixture was then heated at 220° C. for 40 minutes to obtain a water absorbent (5) that included a surface-treated water absorbent resin.

Example 6

Instead of the water absorbent resin (e), the water absorbent resin (f) obtained in Reference Example 6 was used according the procedure of Example 5, so as to obtain a water absorbent (6) that included a surface-treated water absorbent resin.

Comparative Example 1

100 parts of the water absorbent resin (a) obtained in Reference Example 1 was mixed with a surface crosslinking agent containing 0.5 parts of propylene glycol, 0.3 parts of 1,4-butanediol, and 3 parts of water. The mixture was then heated at 210° C. for 40 minutes to obtain a comparative water absorbent (1) that included a surface-treated water absorbent resin.

Comparative Example 2

100 parts of the water absorbent resin (d) obtained in Reference Example 4 was mixed with a surface crosslinking agent containing 0.02 parts of ethyleneglycoldiglycidylether, 0.3 parts of 1,4-butanediol, 0.4 parts of propylene glycol, and 2 parts of water. The mixture was then heated at 195° C. for 50 minutes to obtain a comparative water absorbent (2) that included a surface-treated water absorbent resin.

Comparative Example 3

Except that heating was carried out at 210° C. for 40 minutes, the procedure of Comparative Example 3 was followed to obtain a comparative water absorbent (3) that included a surface-treated water absorbent resin.

Comparative Example 4

The water absorbent resin (c) obtained in Reference Example 3 was heated at 220° C. for 90 minutes without mixing a surface crosslinking agent, so as to obtain a comparative water absorbent (4).

<Results>

Table 1 shows various properties of the water absorbent resins (a) through (f), including absorbency against no pressure for an aqueous solution of 0.90 weight percent sodium chloride, soluble amount (weight (wt.)percent), and particle size distribution (weight (wt.)percent). Tables 2 and 3 show absorbency against no pressure for the solutions S0 through S7, in which Table 2 represents water absorbents (1) though (6) containing surface-treated water absorbent resins, and Table 3 represents comparative water absorbents (1) through (4), and water absorbent resin (c) used for comparison. Table 4 though 7 show absorbency against pressure (AAP), salt concentration absorption index, and the mean and standard deviation of salt concentration absorption index.

Table 8 shows the result of evaluation for the property (QP absorption amount) of product absorbents using the water absorbents (1) and (2) and the comparative water absorbents (1), (2), and (3). Table 9 shows gel permeability index for the water absorbent (1) and comparative water absorbent (3) at two different pressures (0.3 psi (2.07 kPa) and 0.7 psi (4.83 kPa)), when the solution S6 (aqueous solution of 0.7 mass (weight) percent sodium chloride) was used. Table 10 shows gel permeability index for the water absorbent (1) and comparative water absorbent (3) at 0.3 psi (2.07 kPa), when the solutions S0, S3, S6, and S7 were used. Table 11 shows the result of evaluation for the property (QP absorption index) of the product absorbents using the water absorbent (1) and comparative water absorbents (1) and (3).

Tables 12 and 13 show salt tolerance index for water absorbents (1) through (6) containing a surface-treated water absorbent resin. Tables 12 and 13 also show salt tolerance index for comparative water absorbents (1) through (4), and water absorbent resin (c) for comparison.

TABLE 1

|  | WATER ABSORBENT RESIN (a) | WATER ABSORBENT RESIN (b) | WATER ABSORBENT RESIN (c) | WATER ABSORBENT RESIN (d) | WATER ABSORBENT RESIN (e) | WATER ABSORBENT RESIN (f) |
| --- | --- | --- | --- | --- | --- | --- |
| ABSORBENCY UNDER NO PRESSURE (g/g) (0.9 PERCENT NaCl AQUEOUS SOLUTION) | 32.0 | 30.0 | 20.1 | 40.0 | 20.2 | 14.8 |
| SOLUBLE AMOUNT (WT. PERCENT) | 10.0 | 9.0 | 2.0 | 12.0 | 1.8 | 0.9 |
| PARTICLE SIZE DISTRIBUTION OF WATER ABSORBENT RESIN (WT. PERCENT) |  |  |  |  |  |  |
| 500 μm pass | 94 | 96 | 96 | 93 | 96 | 94 |
| 300 μm pass | 24 | 26 | 26 | 25 | 26 | 24 |
| 150 μm pass | 3 | 2 | 5 | 4 | 5 | 3 |
| 106 μm pass | 1 | 1 | 2 | 3 | 2 | 1 |
| MASS-AVERAGE PARTICLE SIZE D50 (μm) | 350 | 340 | 340 | 350 | 340 | 350 |

TABLE 2

| ABSORBENCY UNDER NO PRESSURE (g/g) | WATER ABSORBENT (1) | WATER ABSORBENT (2) | WATER ABSORBENT (3) | WATER ABSORBENT (4) | WATER ABSORBENT (5) | WATER ABSORBENT (6) |
|---|---|---|---|---|---|---|
| NaCl CONCENTRATION (WT. PERCENT) | | | | | | |
| 0.0 | 73.8 | 68.0 | 56.8 | 58.0 | 54.5 | 36.1 |
| 0.1 | 45.0 | 43.0 | 39.7 | 44.0 | 36.4 | 28.1 |
| 0.2 | 36.3 | 35.0 | 33.5 | 38.0 | 30.3 | 23.2 |
| 0.3 | 30.9 | 29.0 | 31.6 | 33.0 | 26.0 | 21.0 |
| 0.4 | 24.7 | 24.0 | 29.8 | 30.0 | 24.5 | 19.0 |
| 0.5 | 23.2 | 22.0 | 27.1 | 27.0 | 22.5 | 17.0 |
| 0.7 | 20.1 | 19.0 | 24.0 | 24.0 | 20.0 | 14.5 |
| 0.9 | 18.0 | 17.0 | 20.1 | 20.0 | 18.1 | 13.5 |
| PARTICLE SIZE DISTRIBUTION OF WATER ABSORBENT RESIN (WT. PERCENT) | | | | | | |
| 500 μm pass | 95 | 96 | 95 | 93 | 93 | 93 |
| 300 μm pass | 24 | 26 | 25 | 25 | 25 | 25 |
| 150 μm pass | 2 | 3 | 4 | 4 | 4 | 4 |
| 106 μm pass | 1 | 1 | 3 | 3 | 3 | 3 |
| AVERAGE PARTICLE SIZE D50(μm) | 350 | 340 | 350 | 350 | 350 | 350 |

TABLE 3

| ABSORBENCY UNDER NO PRESSURE (g/g) | COMPARATIVE WATER ABSORBENT (1) | COMPARATIVE WATER ABSORBENT (2) | COMPARATIVE WATER ABSORBENT (3) | COMPARATIVE WATER ABSORBENT (4) | ABSORBENT RESIN (c) |
|---|---|---|---|---|---|
| NaCl CONCENTRATION (WT. PERCENT) | | | | | |
| 0.0 | 130.2 | 281.6 | 207.5 | 55.9 | 61.9 |
| 0.1 | 56.4 | 111 | 82.4 | 43.2 | 44.2 |
| 0.2 | 45.7 | 87.3 | 63.5 | 36.7 | 37.7 |
| 0.3 | 38.7 | 69.6 | 56.3 | 33.1 | 32.9 |
| 0.4 | 34.8 | 62 | 50.1 | 28.7 | 29.7 |
| 0.5 | 32.8 | 57.8 | 45.0 | 27.8 | 26.4 |
| 0.7 | 28.1 | 51.8 | 38.6 | 24.6 | 22.3 |
| 0.9 | 28 | 47.7 | 32.0 | 21.1 | 20.1 |
| PARTICLE SIZE DISTRIBUTION OF WATER ABSORBENT RESIN (WT. PERCENT) | | | | | |
| 500 μm pass | 95 | 93 | 97 | 96 | 96 |
| 300 μm pass | 24 | 26 | 25 | 26 | 26 |
| 150 μm pass | 3 | 4 | 4 | 5 | 5 |
| 106 μm pass | 2 | 2 | 3 | 3 | 2 |
| AVERAGE PARTICLE SIZE D50(μm) | 350 | 350 | 340 | 340 | 340 |

TABLE 4

| ABSORBENCY UNDER PRESSURE (g/g) | WATER ABSORBENT (1) | WATER ABSORBENT (2) | WATER ABSORBENT (3) | WATER ABSORBENT (4) | WATER ABSORBENT (5) | WATER ABSORBENT (6) |
|---|---|---|---|---|---|---|
| NaCl CONCENTRATION (WT. PERCENT) | | | | | | |
| 0.0 | 71.7 | 70.0 | 46.7 | 51.0 | 59.3 | 42.8 |
| 0.1 | 40.6 | 42.0 | 36.4 | 38.0 | 35.3 | 29.4 |
| 0.2 | 32.4 | 33.0 | 29.4 | 30.0 | 29.6 | 25.8 |
| 0.3 | 28.5 | 30.0 | 27.7 | 29.0 | 26.0 | 22.0 |
| 0.4 | 25.4 | 25.8 | 24.7 | 25.2 | 23.5 | 21.0 |
| 0.5 | 23.9 | 24.0 | 23.8 | 24.1 | 23.2 | 20.6 |
| 0.7 | 21.5 | 22.0 | 21.3 | 21.4 | 19.8 | 18.3 |
| 0.9 | 18.6 | 19.0 | 18.0 | 18.3 | 19.3 | 17.8 |

TABLE 5

| ABSORBENCY UNDER PRESSURE (g/g) | COMPARATIVE WATER ABSORBENT (1) | COMPARATIVE WATER ABSORBENT (2) | COMPARATIVE WATER ABSORBENT (3) | COMPARATIVE WATER ABSORBENT (4) | WATER ABSORBENT RESIN (c) |
|---|---|---|---|---|---|
| NaCl CONCENTRATION (WT. PERCENT) | | | | | |
| 0.0 | 66.4 | 12.1 | 39.8 | 31.5 | 19.1 |
| 0.1 | 45.2 | 10.3 | 43.9 | 24.1 | 23.9 |
| 0.2 | 37.7 | 9.4 | 38.0 | 20.5 | 19.8 |
| 0.3 | 33.2 | 9.4 | 33.2 | 20.9 | 19.2 |
| 0.4 | 30.9 | 8.6 | 29.0 | 20.4 | 18.1 |
| 0.5 | 28.7 | 8.4 | 28.3 | 20.7 | 17.0 |
| 0.7 | 25.8 | 8.3 | 26.1 | 18.1 | 17.0 |
| 0.9 | 24.0 | 7.6 | 25.0 | 18.3 | 17.0 |

TABLE 6

| SALT CONCENTRATION ABSORPTION INDEX | WATER ABSORBENT (1) | WATER ABSORBENT (2) | WATER ABSORBENT (3) | WATER ABSORBENT (4) | WATER ABSORBENT (5) | WATER ABSORBENT (6) |
|---|---|---|---|---|---|---|
| NaCl CONCENTRATION (WT. PERCENT) | | | | | | |
| 0.0 | 0.97 | 1.03 | 0.82 | 0.88 | 1.09 | 1.19 |
| 0.1 | 0.90 | 0.98 | 0.92 | 0.86 | 0.97 | 1.05 |
| 0.2 | 0.89 | 0.94 | 0.88 | 0.79 | 0.98 | 1.11 |
| 0.3 | 0.92 | 1.03 | 0.88 | 0.88 | 1.00 | 1.05 |
| 0.4 | 1.03 | 1.08 | 0.83 | 0.84 | 0.96 | 1.11 |
| 0.5 | 1.03 | 1.09 | 0.88 | 0.89 | 1.03 | 1.21 |
| 0.7 | 1.07 | 1.16 | 0.89 | 0.89 | 0.99 | 1.26 |
| 0.9 | 1.03 | 1.12 | 0.90 | 0.92 | 1.07 | 1.32 |
| MEAN OF SALT CONCENTRATION ABSORPTION INDEX | 0.98 | 1.05 | 0.87 | 0.87 | 1.01 | 1.16 |
| STANDARD DEVIATION OF SALT CONCENTRATION ABSORPTION INDEX | 0.0041 | 0.0045 | 0.0009 | 0.0013 | 0.0477 | 0.0776 |

TABLE 7

| SALT CONCENTATION ABSORPTION INDEX | COMPARATIVE WATER ABSORBENT (1) | COMPARATIVE WATER ABSORBENT (2) | COMPARATIVE WATER ABSORBENT (3) | COMPARATIVE WATER ABSORBENT (4) | WATER ABSORBENT RESIN (c) |
|---|---|---|---|---|---|
| NaCl CONCENTRATION (WT. PERCENT) | | | | | |
| 0.0 | 0.51 | 0.04 | 0.19 | 0.56 | 0.31 |
| 0.1 | 0.80 | 0.09 | 0.53 | 0.56 | 0.54 |
| 0.2 | 0.82 | 0.11 | 0.60 | 0.56 | 0.53 |
| 0.3 | 0.86 | 0.14 | 0.59 | 0.63 | 0.58 |
| 0.4 | 0.89 | 0.14 | 0.58 | 0.71 | 0.61 |
| 0.5 | 0.88 | 0.15 | 0.63 | 0.74 | 0.64 |
| 0.7 | 0.92 | 0.16 | 0.68 | 0.74 | 0.76 |
| 0.9 | 0.86 | 0.16 | 0.78 | 0.87 | 0.85 |
| MEAN OF SALT CONCENTRATION ABSORPTION INDEX | 0.82 | 0.12 | 0.57 | 0.67 | 0.60 |
| STANDARD DEVIATION OF SALT CONCENTRATION ABSORPTION INDEX | 0.0146 | 0.0014 | 0.0256 | 0.0110 | 0.0229 |

TABLE 8

| ABSORBED SOLUTION | NaCl CONCENTRATION (WT. PERCENT) | WATER ABSORBENT (1) | WATER ABSORBENT (2) | COMPARATIVE WATER ABSORBENT (1) | COMPARATIVE WATER ABSORBENT (2) | COMPARATIVE WATER ABSORBENT (3) |
|---|---|---|---|---|---|---|
| QP ABSORPTION AMOUNT (g) | | | | | | |
| S0 | 0.0 | 300 | 300 | 225 | 90 | 90 |
| S1 | 0.1 | 290 | 300 | 230 | 100 | 100 |
| S2 | 0.2 | 285 | 290 | 230 | 100 | 230 |
| S3 | 0.3 | 280 | 285 | 235 | 90 | 235 |
| S4 | 0.4 | 275 | 270 | 240 | 90 | 240 |
| S5 | 0.5 | 265 | 270 | 240 | 90 | 240 |
| S6 | 0.7 | 250 | 260 | 250 | 80 | 250 |
| S7 | 0.9 | 260 | 250 | 270 | 80 | 270 |
| TOTAL QP ABSORPTION AMOUNT (g) | | 2205 | 2225 | 1920 | 720 | 1655 |

TABLE 9

| | GPI ($10^{-7} \times cm^3 \times s \times g^{-1}$) IN 0.7 WT. PERCENT NaCl AQUEOUS SOLUTION | |
|---|---|---|
| PRESSURE(kPa) | WATER ABSORBENT (1) | COMPARATIVE WATER ABSORBENT (1) |
| 2.07 | 210 | 30 |
| 4.83 | 30 | 4 |

TABLE 10

| | GPI ($10^{-7} \times cm^3 \times s \times g^{-1}$) UNDER 2.07 kPa | | |
|---|---|---|---|
| ABSORBED SOLUTION | NaCl CONCENTRATION (WT. PERCENT) | WATER ABSORBENT (1) | COMPARATIVE WATER ABSORBENT (1) |
| S0 | 0.0 | 22 | 1 |
| S3 | 0.3 | 191 | 21 |
| S6 | 0.7 | 210 | 30 |
| S7 | 0.9 | 242 | 30 |

TABLE 11

| | QP DIFFUSIVITY (PERCENT) | | |
|---|---|---|---|
| ABSORBED SOLUTION | NaCl CONCENTRATION (WT. PERCENT) | WATER ABSORBENT (1) | COMPARATIVE WATER ABSORBENT (1) | COMPARATIVE WATER ABSORBENT (3) |
| S0 | 0.0 | 85 | 57 | 26 |
| S3 | 0.3 | 83 | 58 | 29 |
| S6 | 0.7 | 67 | 60 | 58 |
| S7 | 0.9 | 64 | 60 | 60 |

TABLE 12

| SALT TOLERANCE INDEX | WATER ABSORBENT (1) | WATER ABSORBENT (2) | WATER ABSORBENT (3) | WATER ABSORBENT (4) | WATER ABSORBENT (5) | WATER ABSORBENT (6) |
|---|---|---|---|---|---|---|
| NaCl CONCENTRATION (WT. PERCENT) | | | | | | |
| 0.1 | 0.61 | 0.63 | 0.70 | 0.76 | 0.67 | 0.78 |
| 0.2 | 0.49 | 0.51 | 0.59 | 0.66 | 0.56 | 0.64 |
| 0.3 | 0.42 | 0.43 | 0.56 | 0.57 | 0.48 | 0.58 |
| 0.4 | 0.33 | 0.35 | 0.52 | 0.52 | 0.45 | 0.53 |
| 0.5 | 0.31 | 0.32 | 0.48 | 0.47 | 0.41 | 0.47 |
| 0.7 | 0.27 | 0.28 | 0.42 | 0.41 | 0.37 | 0.40 |
| 0.9 | 0.24 | 0.25 | 0.35 | 0.34 | 0.33 | 0.37 |

TABLE 13

| SALT TOLERANCE INDEX | COMPARATIVE WATER ABSORBENT (1) | COMPARATIVE WATER ABSORBENT (2) | COMPARATIVE WATER ABSORBENT (3) | COMPARATIVE WATER ABSORBENT (4) | WATER ABSORBENT RESIN (c) |
|---|---|---|---|---|---|
| NaCl CONCENTRATION (WT. PERCENT) | | | | | |
| 0.1 | 0.43 | 0.39 | 0.40 | 0.77 | 0.71 |
| 0.2 | 0.35 | 0.31 | 0.31 | 0.66 | 0.61 |
| 0.3 | 0.30 | 0.25 | 0.27 | 0.59 | 0.53 |
| 0.4 | 0.27 | 0.22 | 0.24 | 0.51 | 0.48 |
| 0.5 | 0.25 | 0.21 | 0.22 | 0.50 | 0.43 |
| 0.7 | 0.22 | 0.18 | 0.19 | 0.44 | 0.36 |
| 0.9 | 0.22 | 0.17 | 0.15 | 0.38 | 0.32 |

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The particulate water absorbent of the present invention exhibits a superior performance irrespective of the conditions of use, making it applicable to a wide range of fields as an agricultural or horticultural water retainer, industrial water retainer, desiccant, dehumidifying agent, or building material. The particulate water absorbent is particularly suitable for sanitary articles as represented by paper diapers and sanitary napkins for absorbing body fluids including feces, urine, and blood.

The invention claimed is:

1. A particulate water absorbent containing a water absorbent resin prepared by crosslinking a water-soluble unsaturated monomer mainly containing an acrylic acid and/or a salt (neutralizer) of acrylic acid, the water absorbent resin being particular in shape and containing particles of a particle size in a range of not less than 106 μm and less than 850 μm in an amount of not less than 90 mass percent with respect to a total mass of the water absorbent resin, the particulate water absorbent having a first salt concentration absorption index of not less than 0.60 as measured by a formula below when ion exchange water is used as an aqueous solution of a constant salt concentration:

(salt concentration absorption index)=(absorbency for an aqueous solution of a constant salt concentration against a pressure of 4.83 kPa)/(absorbency for an aqueous solution of a constant salt concentration against no pressure), where the numerator is absorbency against a pressure of 4.83 kPa when the particulate water absorbent is impregnated with the aqueous solution of a constant salt concentration for 60 minutes, and the denominator is absorbency against no pressure when the particulate water absorbent is impregnated with the aqueous solution of a constant salt concentration for 60 minutes.

2. A particulate water absorbent containing a water absorbent resin prepared by crosslinking a water-soluble unsaturated monomer mainly containing an acrylic acid and/or a salt (neutralizer) of acrylic acid, the water absorbent resin being particular in shape and containing particles of a particle size in a range of not less than 106 μm and less than 850 μm in an amount of not less than 90 mass percent with respect to a total mass of the water absorbent resin, the particulate water absorbent having an absorbency of not less than 50 g/g when impregnated with ion exchange water for 60 minutes against a pressure of 4.83 kPa.

3. The particulate water absorbent as set forth in claim 1, wherein the particulate water absorbent has a second salt concentration absorption index of not less than 0.80 as measured by the formula when the aqueous solution of a constant salt concentration is an aqueous solution of 0.10 mass percent sodium chloride.

4. The particulate water absorbent as set forth in claim 1, wherein the particulate water absorbent has third, fourth, fifth, and sixth salt concentration absorption indices as measured by the formula when aqueous solutions of 0.30 mass percent, 0.50 mass percent, 0.70 mass percent, and 0.90 mass percent sodium chloride, respectively, are used as the aqueous solution of a constant salt concentration, and wherein at least one of the third, fourth, fifth, and sixth salt concentration absorption indices is not less than 0.90.

5. The particulate water absorbent as set forth in claim 4, wherein the particulate water absorbent has a mean salt concentration absorption index of not less than 0.90 as measured by taking a mean of the third, fourth, fifth, and sixth salt concentration absorption indices.

6. The particulate water absorbent as set forth in claim 5, wherein the mean salt concentration absorption index has a standard deviation in a range of 0 to 0.100.

7. The particulate water absorbent as set forth in claim 1, wherein the particulate water absorbent has a first salt tolerance index of not less than 0.40 as measured by a formula below when an aqueous solution of 0.10 mass percent sodium chloride is used as an aqueous solution of a constant salt concentration:

(salt tolerance index)=(absorbency for an aqueous solution of a constant salt concentration against no pressure)/(absorbency for ion exchange water against no pressure), where the numerator is absorbency against no pressure when the particulate water absorbent is impregnated with the aqueous solution of a constant salt concentration for 60 minutes, and the denominator is absorbency against no pressure when the particulate water absorbent is impregnated with ion exchange water for 60 minutes.

8. The particulate water absorbent as set forth in claim 1, wherein the particulate water absorbent has an absorbency in a range of 10 g/g to 27 g/g when impregnated with an aqueous solution of 0.90 mass percent sodium chloride for 60 minutes against no pressure.

9. The particulate water absorbent as set forth in claim 1, wherein the particulate water absorbent has an absorbency in a range of 10 g/g to 27 g/g when impregnated with an aqueous solution of 0.90 mass percent sodium chloride for 60 minutes against a pressure of 4.83 kPa.

10. The particulate water absorbent asset forth in claim 1, wherein the particulate water absorbent further contains water-insoluble fine particles.

11. The particulate water absorbent as set forth in claim 1, wherein the particulate water absorbent has a gel permeability index of not less than 15 for ion exchange water against a pressure of 2.07 kPa.

12. The particulate water absorbent as set forth claim 1, wherein the particulate water absorbent has a gel permeability index of not less than 50 for an aqueous solution of 0.30 mass percent sodium chloride against a pressure of 2.07 kPa.

13. The particulate water absorbent as set forth in claim 1, wherein the particulate water absorbent has a gel permeability index of not less than 15 for an aqueous solution of 0.70 mass percent sodium chloride against a pressure of 4.83 kPa.

14. The particulate water absorbent as set forth in claim 1, wherein the water absorbent resin is treated by a surface modification process.

15. The particulate water absorbent as set forth in claim 14, wherein the surface modification process crosslinks a surface of the water absorbent resin.

16. The particulate water absorbent as set forth in claim 1, wherein the particulate water absorbent resin contains a carboxylic group.

17. A sanitary article for absorbing a body fluid, comprising the particulate water absorbent of claim 1.

18. The sanitary article as set forth in claim 17, further comprising an absorption layer whose core concentration is in a range of not less than 0.3 to not more than 1.0 as measured by a formula below:

(core concentration)=(mass of particulate water absorbent)/((mass of particulate water absorbent)+(mass of fiber material)).

* * * * *

UNITED STATES PATENT AND TRADEMARK OFFICE
CERTIFICATE OF CORRECTION

PATENT NO. : 7,435,477 B2
APPLICATION NO. : 10/509000
DATED : October 24, 2008
INVENTOR(S) : Y. Adachi et al.

It is certified that error appears in the above-identified patent and that said Letters Patent is hereby corrected as shown below:

Title page, item (73) Assignee: Nippon Shokubi Co., Ltd., Osaka (JP)

The Assignee should be listed as Nippon Shokubai Co., Ltd.

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,435,477 B2 |
| APPLICATION NO. | : 10/509000 |
| DATED | : October 14, 2008 |
| INVENTOR(S) | : Y. Adachi et al. |

It is certified that error appears in the above-identified patent and that said Letters Patent is hereby corrected as shown below:

Title page, item (73) Assignee: Nippon Shokubi Co., Ltd., Osaka (JP)

The Assignee should be listed as Nippon Shokubai Co., Ltd.

This certificate supersedes the Certificate of Correction issued December 30, 2008.

Signed and Sealed this

Third Day of February, 2009

JOHN DOLL
*Acting Director of the United States Patent and Trademark Office*